(12) United States Patent
Kling

(10) Patent No.: US 11,319,133 B2
(45) Date of Patent: May 3, 2022

(54) MULTI-LAMINATE FOLDED MATERIALS FOR CONSTRUCTION OF BOXES AND OTHER OBJECTS

(71) Applicant: FOLDSTAR, INC., Holmdel, NJ (US)

(72) Inventor: Daniel H. Kling, Newtown, PA (US)

( * ) Notice: Subject to any disclaimer, the term of this patent is extended or adjusted under 35 U.S.C. 154(b) by 0 days.

(21) Appl. No.: 16/267,156

(22) Filed: Feb. 4, 2019

(65) Prior Publication Data

US 2019/0241342 A1 Aug. 8, 2019

Related U.S. Application Data

(60) Provisional application No. 62/625,701, filed on Feb. 2, 2018.

(51) Int. Cl.
*B32B 29/08* (2006.01)
*B32B 3/28* (2006.01)
*B65D 81/02* (2006.01)
*B65D 5/02* (2006.01)
*B65D 5/50* (2006.01)
*B32B 7/05* (2019.01)

(52) U.S. Cl.
CPC ............. *B65D 81/022* (2013.01); *B65D 5/02* (2013.01); *B65D 5/5054* (2013.01); *B65D 81/02* (2013.01); *B32B 3/28* (2013.01); *B32B 7/05* (2019.01); *B32B 29/08* (2013.01); *B32B 2439/62* (2013.01)

(58) Field of Classification Search
CPC .... B32B 29/08; B65D 81/022; B65D 5/5054; Y10T 428/24694; Y10T 428/24711
See application file for complete search history.

(56) References Cited

U.S. PATENT DOCUMENTS

| 1,189,518 | A | * | 7/1916 | Wood | B31F 1/07 |
|---|---|---|---|---|---|
| | | | | | 156/206 |
| 1,875,188 | A | * | 8/1932 | Williams | E04C 2/32 |
| | | | | | 428/178 |
| 2,963,128 | A | * | 12/1960 | Rapp | E04C 2/3405 |
| | | | | | 428/594 |
| 3,217,845 | A | * | 11/1965 | Koeller | B29C 53/285 |
| | | | | | 428/604 |

(Continued)

FOREIGN PATENT DOCUMENTS

| EP | 3153624 A1 | * | 4/2017 | ............. B32B 29/08 |
|---|---|---|---|---|
| WO | WO-9744529 A1 | * | 11/1997 | ............. B32B 7/02 |

(Continued)

*Primary Examiner* — Peter N Helvey
*Assistant Examiner* — Phillip D Schmidt
(74) *Attorney, Agent, or Firm* — John E. Boyd; Christopher R. Kinkade; FisherBroyles, LLC

(57) ABSTRACT

The construction and design of new multi-laminate sheet materials for the fabrication of shipping containers, boxes, furniture, consumer items, and many other products, including those generally using panels in their design, is disclosed. These new materials are produced by employing advanced folding techniques, to yield lightweight, cost effective multi-laminates. At least one layer in the multi-laminate structure is a folded sheet tessellation which, in some embodiments, can have doubly periodic folded geometries with fold creases in multiple non-parallel directions. The various layers of the construction can interlock with each other to collectively provide mechanical stiffness, strength, energy absorption and other properties.

26 Claims, 24 Drawing Sheets

(56) References Cited

U.S. PATENT DOCUMENTS

| | | | | |
|---|---|---|---|---|
| 3,574,103 A * | 4/1971 | Latkin | | B65D 65/44 |
| | | | | 428/72 |
| 3,906,571 A * | 9/1975 | Zetlin | | E01D 1/00 |
| | | | | 14/74.5 |
| 3,935,360 A * | 1/1976 | Brown | | E04C 2/322 |
| | | | | 428/186 |
| 4,034,135 A * | 7/1977 | Passmore | | B32B 3/28 |
| | | | | 428/184 |
| 5,028,474 A * | 7/1991 | Czaplicki | | B32B 27/06 |
| | | | | 428/178 |
| 5,128,195 A * | 7/1992 | Hegedus | | B32B 3/18 |
| | | | | 428/174 |
| 5,285,957 A * | 2/1994 | Halsell | | B32B 29/02 |
| | | | | 229/199 |
| 5,543,204 A * | 8/1996 | Ray | | B32B 3/28 |
| | | | | 428/179 |
| 5,575,418 A * | 11/1996 | Wu | | A23B 7/148 |
| | | | | 229/5.81 |
| 5,799,861 A * | 9/1998 | Bonner | | B32B 29/08 |
| | | | | 229/198.1 |
| 5,894,046 A * | 4/1999 | Kim | | B31F 1/28 |
| | | | | 428/182 |
| 6,139,938 A * | 10/2000 | Lingle | | B31F 1/28 |
| | | | | 428/182 |
| 7,010,897 B1 * | 3/2006 | Kuppers | | E04C 2/3405 |
| | | | | 52/793.1 |
| 7,051,489 B1 * | 5/2006 | Swiszcz | | E04B 9/0442 |
| | | | | 160/84.05 |
| 7,762,938 B2 * | 7/2010 | Gale | | B32B 3/12 |
| | | | | 428/116 |
| 8,647,251 B2 * | 2/2014 | Kling | | B31D 5/04 |
| | | | | 493/405 |
| 10,124,555 B2 * | 11/2018 | Ebnother | | B32B 3/30 |
| 10,174,502 B2 * | 1/2019 | Kim | | E04C 2/365 |
| 2005/0008826 A1 * | 1/2005 | Snel | | B32B 29/08 |
| | | | | 428/178 |
| 2005/0089675 A1 * | 4/2005 | Christiansen | | B32B 3/12 |
| | | | | 428/174 |
| 2009/0022959 A1 * | 1/2009 | Snel | | B32B 13/08 |
| | | | | 428/174 |
| 2012/0179429 A1 * | 7/2012 | Kling | | G06T 17/20 |
| | | | | 703/1 |
| 2017/0036415 A1 * | 2/2017 | Ebnother | | B32B 7/05 |
| 2017/0282489 A1 * | 10/2017 | Greenfield | | B32B 7/12 |
| 2019/0039344 A1 * | 2/2019 | Ebnother | | B32B 15/18 |

FOREIGN PATENT DOCUMENTS

| | | | | |
|---|---|---|---|---|
| WO | WO-2006047348 A1 * | 5/2006 | ......... | B32B 29/005 |
| WO | WO-2015075579 A1 * | 5/2015 | | |
| WO | WO-2019105525 A1 * | 6/2019 | ............. | B32B 1/08 |

* cited by examiner

Key:
flat sheet ————
Strip Map ————
Corrugate ————

United States Patent US 11,319,133 B2

MULTI-LAMINATE FOLDED MATERIALS FOR CONSTRUCTION OF BOXES AND OTHER OBJECTS

CROSS REFERENCE TO RELATED APPLICATIONS

This application claims the benefit of U.S. Provisional Application No. 62/625,701, filed Feb. 2, 2018.

FIELD OF THE INVENTION

The inventive concepts relate to multi-laminate sheet materials, core materials, energy absorbing materials, engineered textural structures, tessellated materials, folding geometries for sheet materials, composite materials, and to products fabricated from these materials and structures, including for example structural panels, acoustic products, decorative products, shock absorbing products, shipping containers, transportation vessels, building materials, consumer products, and others.

BACKGROUND OF THE INVENTION

Sheet materials may be folded in one direction along parallel creases or curves to produce a geometry that is often called an extruded surface or a corrugate profile. In this case a single cross section in a plane normal to the creases defines the geometry. In U.S. Pat. No. 6,935,997, the contents of which are incorporated by reference herein in their entirety, several methods are given for designing folded geometries for sheet materials that have crease patterns with lines in many non-parallel directions. The crease patterns form tessellations with many vertices, and may have periodicity in two directions. Methods for generating these folding geometries are disclosed in U.S. Pat. No. 6,935,997, and include the Two Cross Section Method, Wave-Tessellation Method, Wave-Fold Method, Strip-Map Method, and Composition of Local Isometries Method. The folded tessellations are also called doubly-periodic folded surfaces (DPFs).

The two primary types of sheet materials currently used to form containers and other structures are the sine-wave type corrugate with two laminated face sheets; and the honeycomb core material with two laminated face sheets. The corrugate with laminated face sheets lacks multi-directional load-bearing capability, and may lack suitable structural performance for applications requiring relatively high strength and impact resistance. The honeycomb laminate is costly to manufacture, and has limited geometric parameters for tailoring its mechanical performance for a particular application. For example, the materials used to form containers and other structures may need various proportions of stiffness, flexural strength, vibration absorption, impact mitigation, crush zones, sound absorption, cell shape, and other mechanical properties.

SUMMARY OF THE INVENTION

Doubly-periodic folded sheet materials offer efficient methods for producing complex structural geometries. In FIG. 1A, FIG. 1B and FIG. 1C, a folded tessellation is shown in its planer folding pattern and two folded states. Folding processes induce little or no in-plane deformation in the material. Continuous methods for fabricating these materials are given in U.S. Pat. No. 6,935,997, and in U.S. Pat. No. 9,005,096, the contents of which are incorporated by reference herein in their entirety. Folding offers both an economical manufacturing process, and little or no in-plane deformation, and applies to a wide range of materials including, for example, papers, non-wovens, wovens, polymers, composites, and metals.

To enhance the structural performance of a folded tessellation, also called a doubly-periodic folded material (DPF), the present disclosure includes a method for adjoining additional layers of sheet materials to the DPF, to lock the DPF in a fixed folded state with multiple redundant means of rigidity. Applications for shipping containers are highlighted as an exemplary application. Efficient manufacturing methods are also described, yielding an economical process for forming a diverse range of structural geometries. These materials may be laminated together with other DPFs, corrugate profiles, or flat or cylindrical sheets, to produce truss-like geometries with enhanced performance. The DPF geometries may be assembled together or with other sheet products to produce advanced engineered structures. By selecting a DPF geometry and the geometry of the other laminates, a diverse range of materials may be manufactured. These materials have broad application in aerospace, transportation, shipping materials, consumer products, civil infrastructure, building materials, architectural materials, and other industries.

In one aspect, the inventive concepts encompass a laminate panel having at least two sheet material layers. At least one sheet material layer is a folded tessellation having at least one of an internal tie area, and face-to-face bonding sites with another sheet material layer.

In another aspect, the inventive concepts encompass a laminate panel comprising at least three layers. At least one layer is a folded tessellation; at least one layer is a corrugate sheet; and at least one layer is a flat or cylindrical sheet.

In another aspect, the inventive concepts encompass a shipping container having at least one wall or floor that includes at least one folded tessellation.

BRIEF DESCRIPTION OF THE DRAWINGS

The following drawings are illustrative of particular embodiments of the present disclosure and do not limit the scope of the present disclosure. The drawings are not to scale and are intended for use in conjunction with the explanations in the following detailed description. Various non-limiting embodiments will be described in detail with reference to the drawings, wherein like reference numerals represent like parts and assemblies throughout the several views.

DETAILED DESCRIPTION OF ILLUSTRATIVE EMBODIMENTS

Figure 1A:
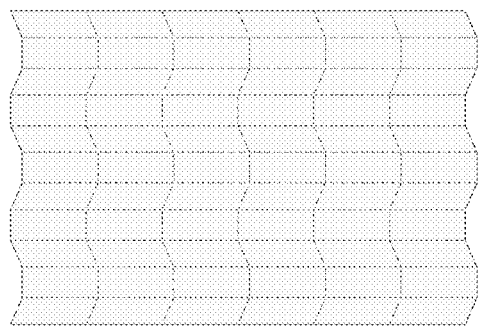
FIG. 1A is a flat tessellation for a doubly-periodic folding pattern.
Figure 1B:
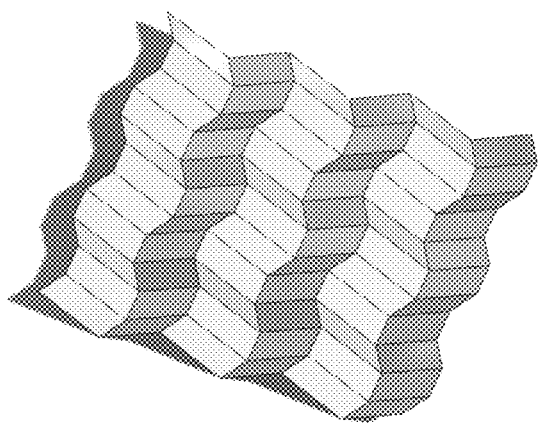
FIG. 1B is the tessellation of FIG. 1A partially folded.
Figure 1C:
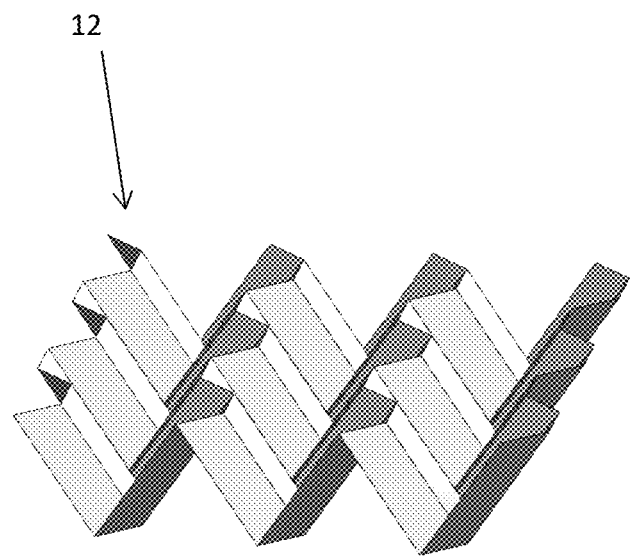
FIG. 1C is the tessellation of FIG. 1A folded to its intended structural geometry.
Figure 2A:
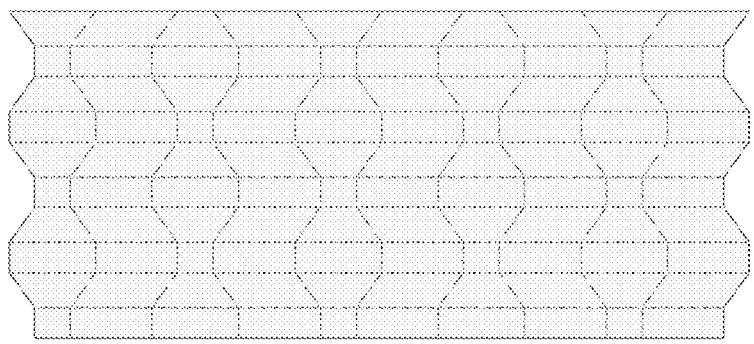
FIG. 2A is a flat tessellation for a doubly-periodic folding pattern.
Figure 2B:
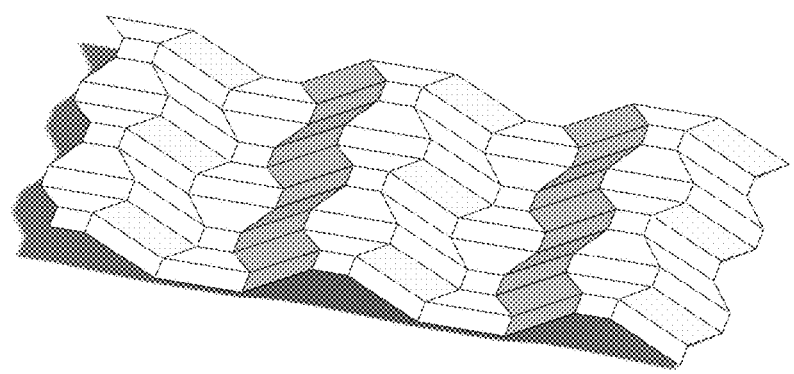
FIG. 2B is the tessellation of FIG. 2A partially folded.
Figure 2C:
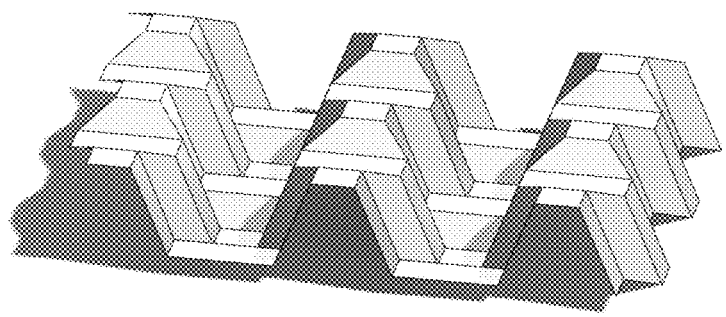
FIG. 2C is the tessellation of FIG. 2A folded to its intended structural geometry.
Figure 3A:
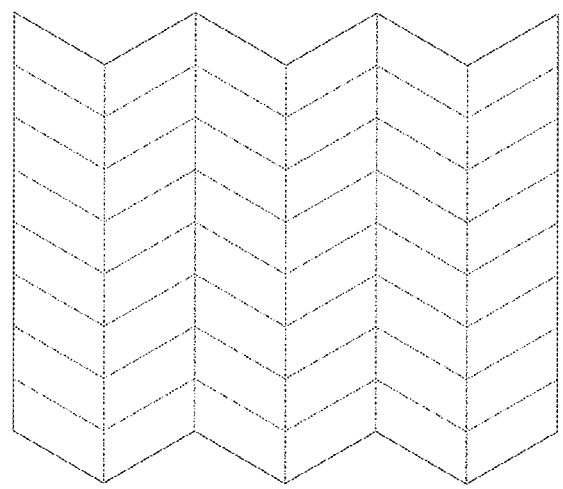
FIG. 3A is a flat tessellation for a doubly-periodic folding pattern.
Figure 3B:
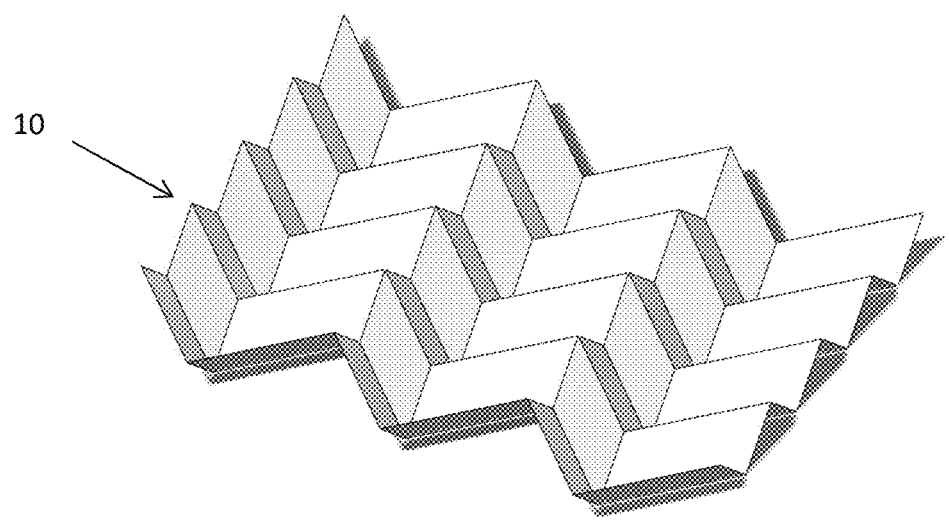
FIG. 3B is the tessellation of FIG. 3A folded to its intended structural geometry.
Figure 4A:
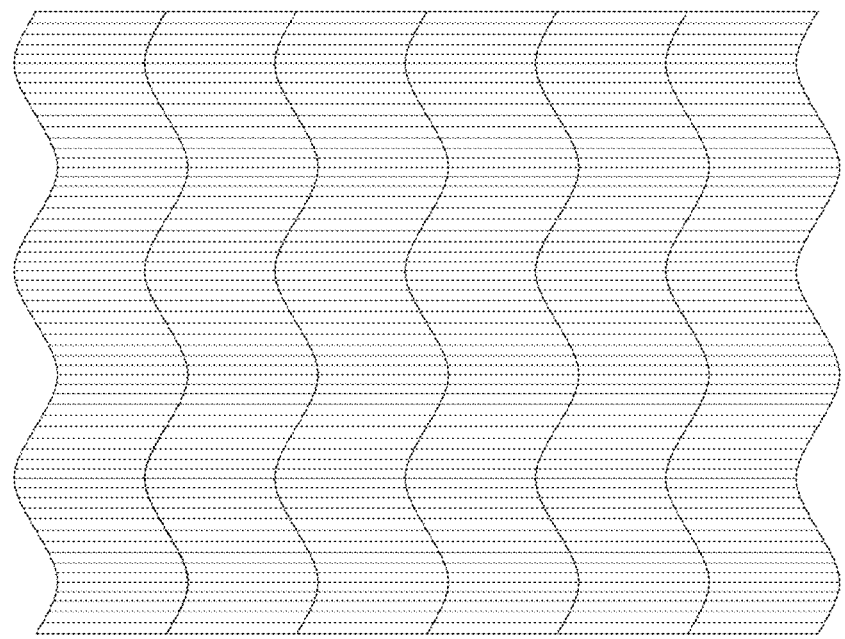
FIG. 4A is a flat tessellation for a doubly-periodic folding pattern.
Figure 4B:
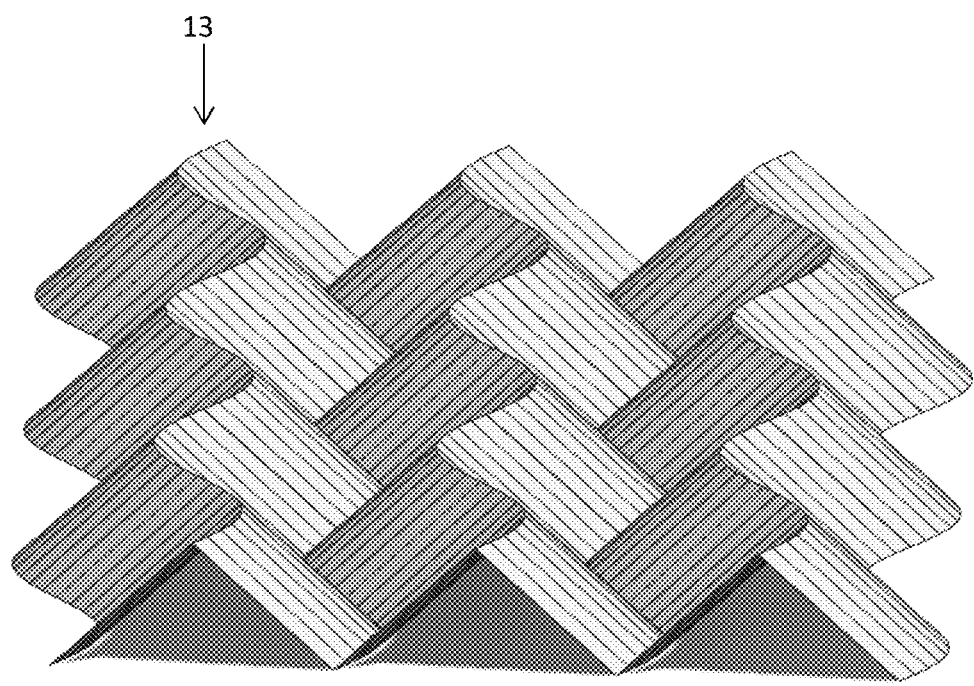
FIG. 4B is the tessellation of FIG. 4A folded to its intended structural geometry.

In one embodiment, multiple copies of a folded pattern are laminated together in their folded state. FIG. 1A, FIG. 1B, and FIG. 1C show a material advancing from its flat tessellation to a partially folded geometry and to its fully folded DPF configuration. FIG. 2A, FIG. 2B, and FIG. 2C show a similar folding process for a different geometry. FIG. 3A and FIG. 3B show the unfolded tessellation and the folded DPF form, respectively. FIG. 4A and FIG. 4B show the unfolded tessellation and the folded DPF form, for another pattern.

Figure 6A:
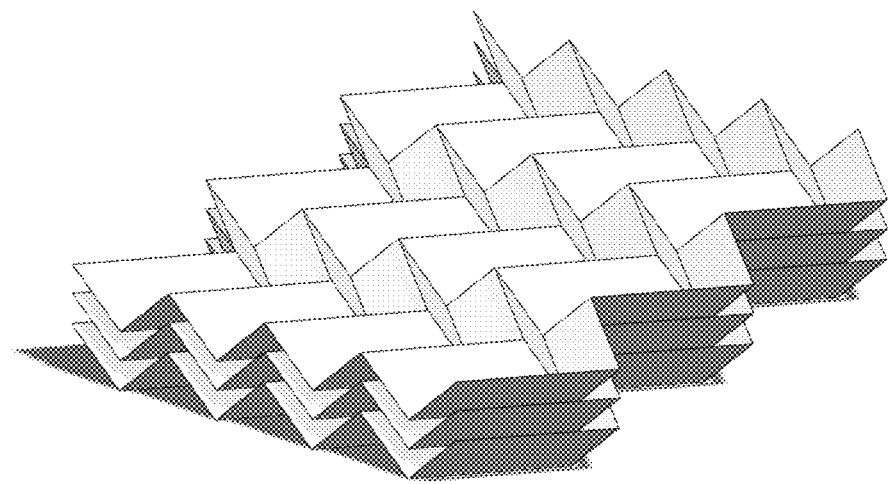
FIG. 6A shows the nested stacking of three DPFs from FIG. 3B in preparation for lamination.
Figure 7A:
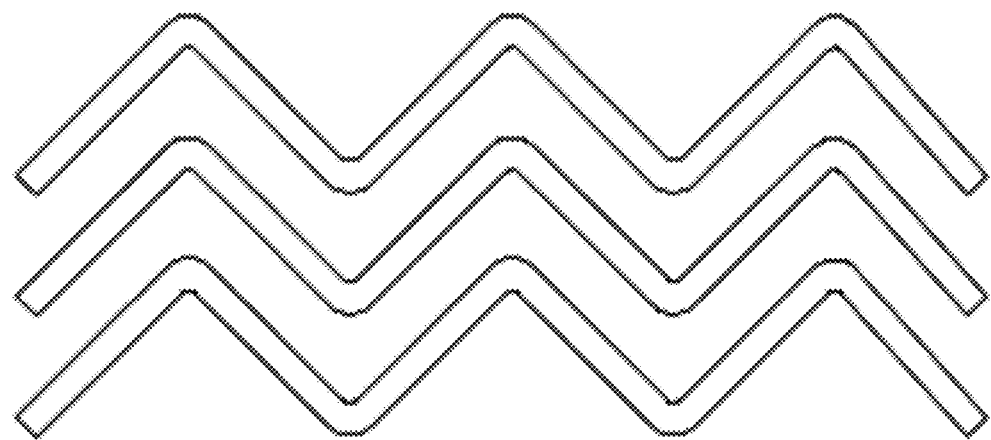
FIG. 7A shows a schematic of three nested DPFs with fold radius indicated at the fold creases.
Figure 7B:
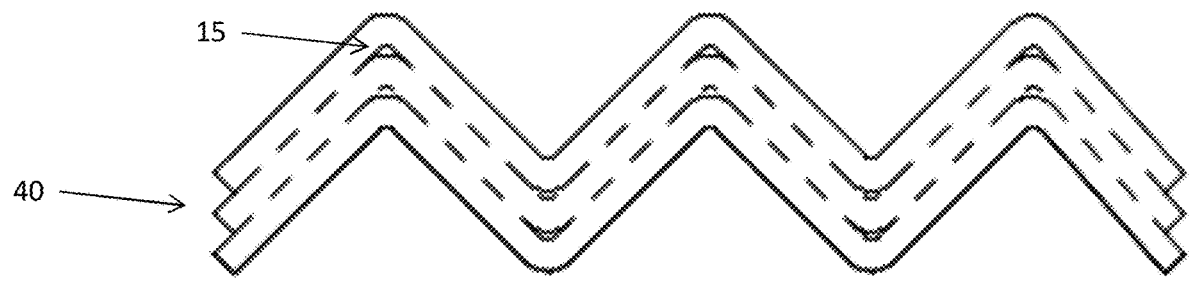
FIG. 7B shows a schematic of the materials in FIG. 7A after lamination

To stiffen the DPF in its folded state, multiple copies of the DPF form may be laminated together. For example, FIG. 6A shows three of the patterns from FIG. 3B nested before laminating. After laminating the multiple nested DPFs, the increased stiffness at the fold lines causes them to become more rigid and to resist change in their fold angles. Collectively the stiffened fold lines will lock the sheet geometry in the folded state. To see the effect, consider the thickness of the individual sheets and their fold radius at the fold lines. The thickness causes the sheets to stack with a slight shifting of register. FIG. 7A and FIG. 7B show a schematic of a sheet with drawn thickness and fold radius. The shifting of register is seen easily by the stepping on the ends 40 of FIG. 7B. Once bonded, the multi-laminate will not unfold easily as the strain associated with the fold radius is too severe for the thick material, and the stepping phenomenon cannot be reversed due to the resulting shear between the laminates. If gapping 15 occurs near the fold radius or elsewhere this may be filled with glue resin or air.

Figure 6B:
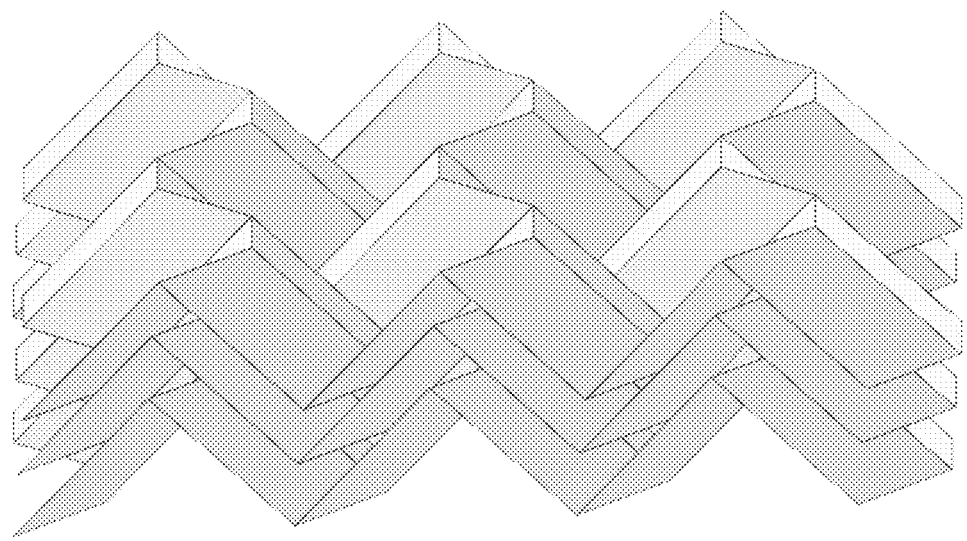
FIG. 6B shows the nested stacking of three DPFs from FIG. 1C in preparation for lamination.

Using the terminology from U.S. Pat. No. 6,935,997, the DPFs in FIG. 6A were designed using the Wave-Fold Method with a triangle wave (10) for the column cross section (CCS) and a triangle wave for the row-edge chain (RED). Such nested stacking of other types of DPFs will also produce stiff materials. For example, FIG. 6B shows the pattern from FIG. 1C stacked before laminating. This pattern was designed using the triangle wave (10) for the CCS and the hex wave (12) for the RED.

Figure 5:
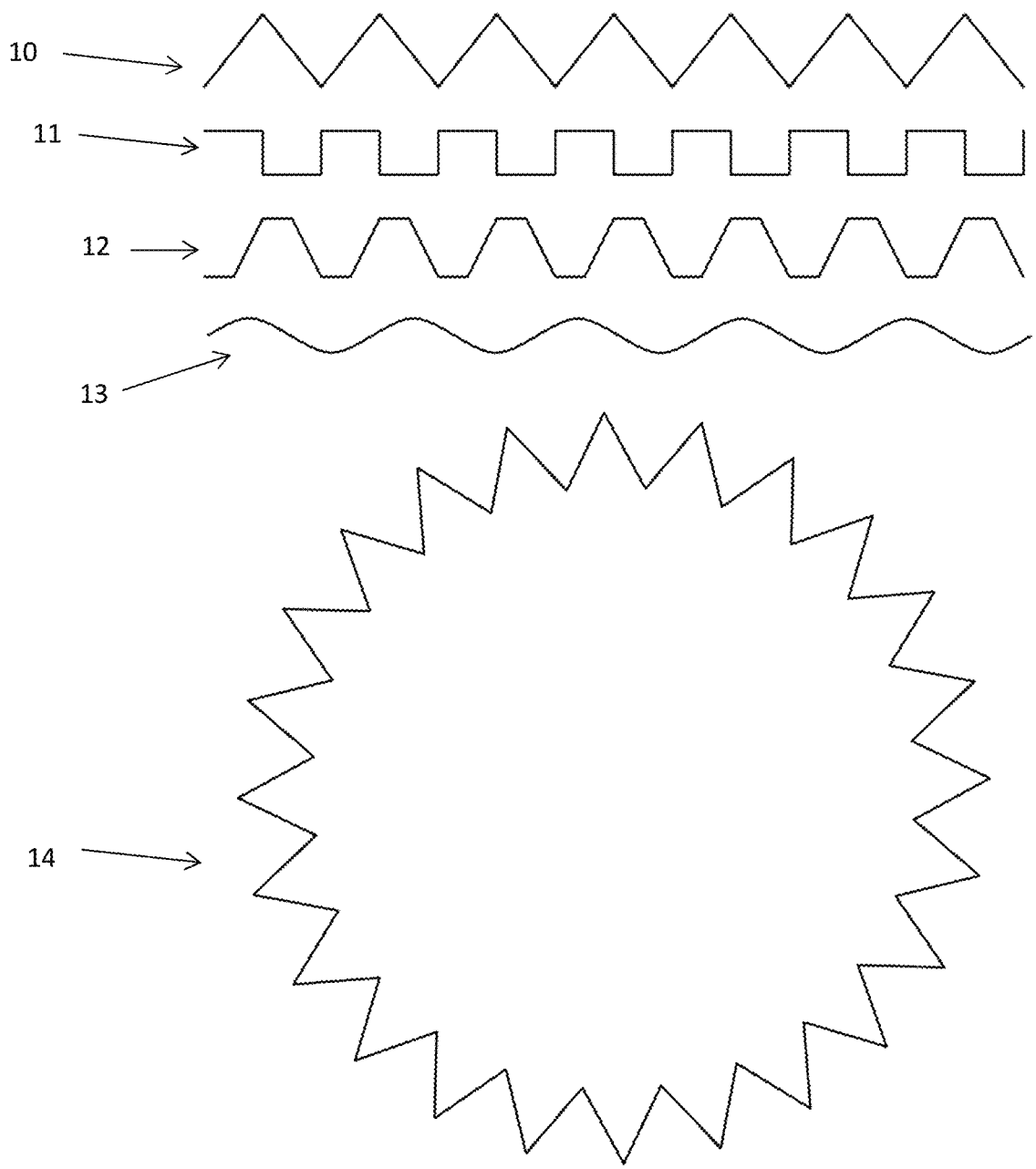
FIG. 5 has five wave types with 10,11,12,13 suitable for RED waves and 10,11,12,14 suitable for CCS waves.
Figure 8:
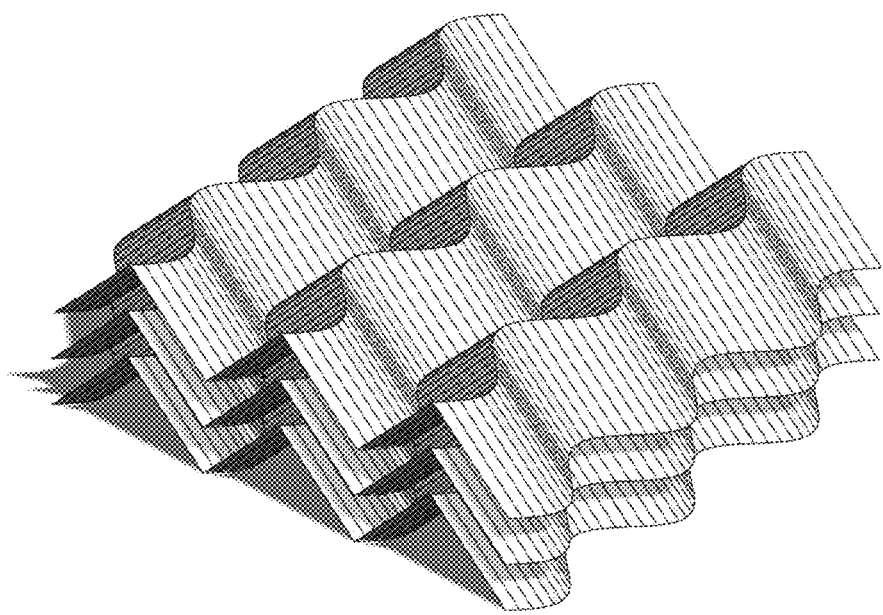
FIG. 8 shows the nested stacking of three DPFs from FIG. 4B in preparation for lamination.

FIG. 8 shows a nested stacking of the DPF from FIG. 4B. This DPF was designed using a triangle wave (10) for the CCS and a sine-type wave (13) for the RED. The wave classes in FIG. 5 represent general architypes for the waves and their symmetry conditions, where the pattern unit segment lengths and their slopes may be changed and remain in the same family. Note that the curvature of the surfaces in the sine wave type material in FIG. 4B will change with folding and unfolding, so that the multi-laminate of nested DPFs formed by the lamination suggested in FIG. 8 will resist folding and unfolding due to the stresses from both the fold radius on the fold lines and the change in curvature on the entire surface.

This nested multi-laminate construction produces a rigid material that could not readily be folded from a single sheet of the same compound thickness. The construction may be applied to all of the DPFs generated by the row and column methods disclosed in U.S. Pat. No. 6,935,997, including the Two Cross Section Method, Wave-Tessellation Method, Wave-Fold Method, Strip-Map Method, and Composition of Local Isometries Method. Due to the complexity of the fold lines in the DPF materials, the ability to produce these thicker materials is particularly valuable.

Figure 9:
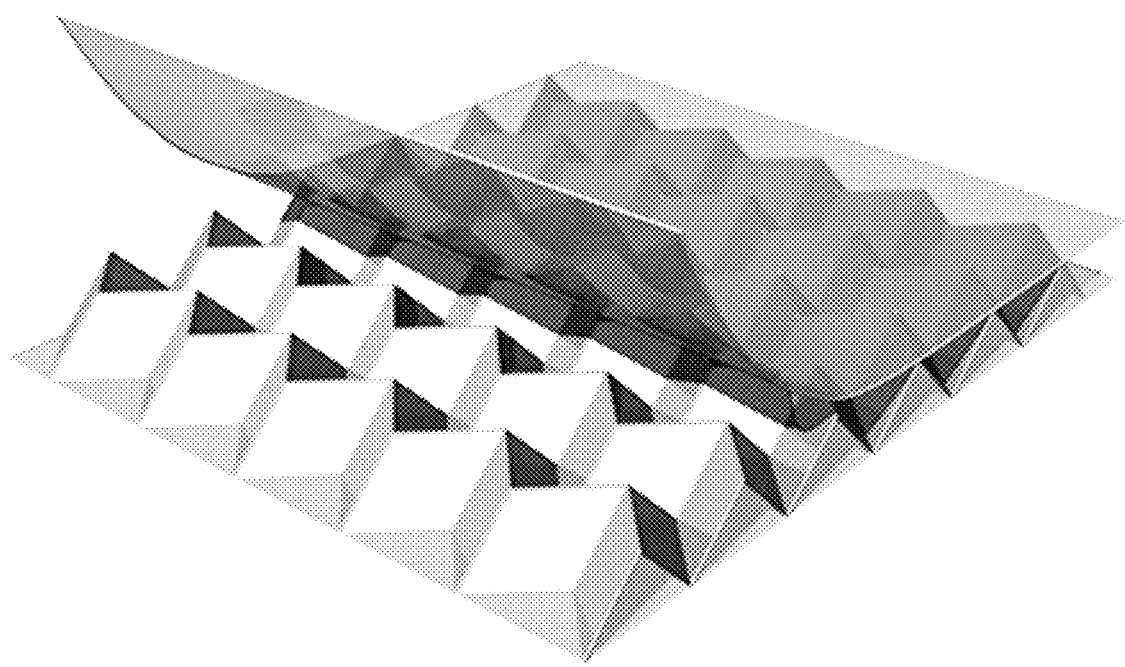
FIG. 9 shows a DPF with two laminated face sheets. The top sheet is peeled back for view.

In another approach, the DPF may be stiffened in a folding state by having one or more laminate faces attached to form a truss-like structure. FIG. 9 shows an example. In this example, the laminate material attaches along row fold edges of the DPF. This sequence is called the RED in U.S. Pat. No. 6,935,997. Other embodiments will construct face-to-face bonding areas, where the gluing occurs on rectangular regions. In this embodiment the laminate face is tangent to the RED fold edge sequence, providing the truss-like geometry to the three-sheet assembly. Note in FIG. 9 the triangle waves tangent to a face are separated by a line of sight. In a preferred embodiment, the triangle waves or other row edge chains may have greater relative amplitude, and nest to reduce the buckling tendency in the face sheet. Also, the face sheet be thicker or of stiffer material than the folded DPF sheet material, to smoothly span from row edge chain to row edge chain.

Figure 10:
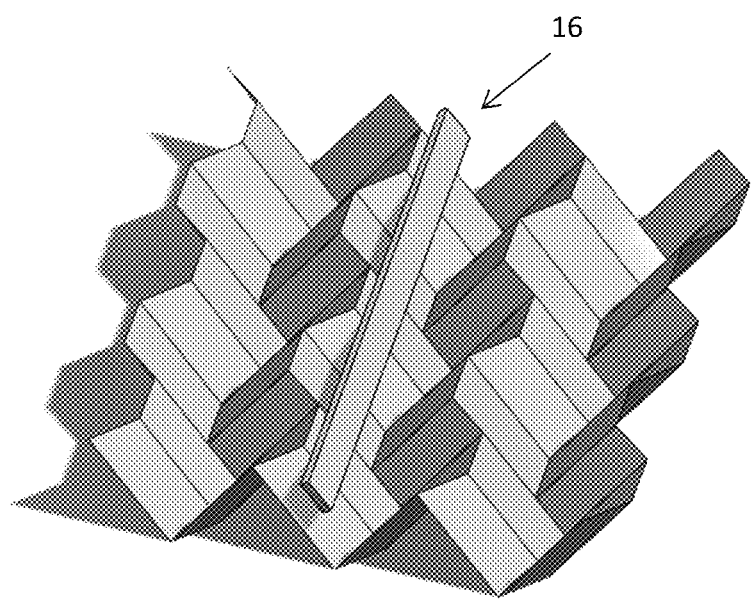
FIG. 10 illustrates how the mechanical forces of a cross-bar would apply stiffness and a locking action to the folding process.
Figure 11A:
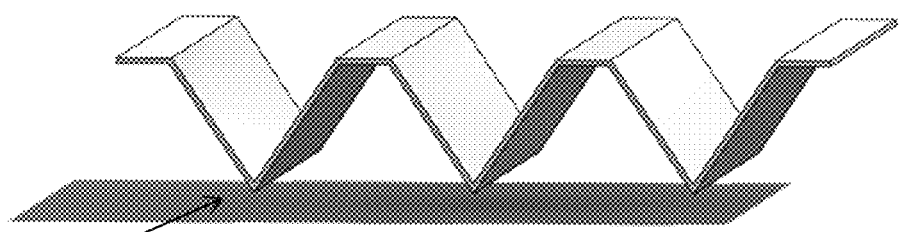
FIG. 11A shows a corrugate sheet that nests well in the DPF of FIG. 10.
Figure 11B:
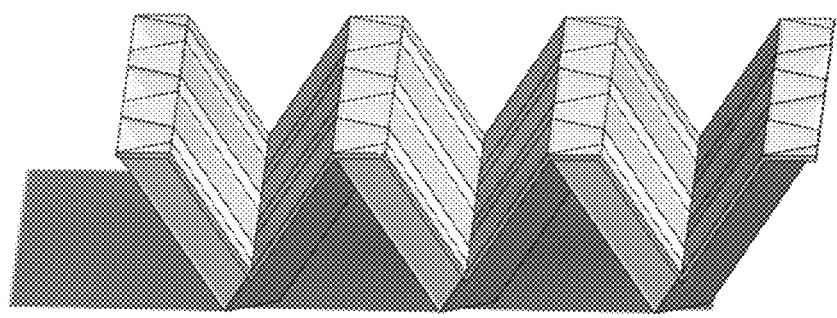
FIG. 11B shows the corrugate sheet of FIG. 11A laminated onto the DPF of FIG. 10.

In another embodiment, the folded state of a DPF is locked by laminating a nesting folded corrugate profile sheet. The profile of the corrugate will be specified based on the folded profile of the DPF. To lock the folding process shown in FIG. 1C in the folded state, a spanning crossbar (16) could be attached as shown in FIG. 10. The crossbar is tangent to the DPF in flat rectangular regions that repeat down the row direction of the DPF. These regions offer excellent bonding contact for glues or adhesives. The crossbar may be repeated in the column direction to each of the corresponding symmetry positions in the DPF. In FIG. 11B, a single folded corrugate sheet is attached to the DPF that supplies the bracing action of each of the repeating crossbars. The corrugate sheet is shown isolated in FIG. 11A. Thus by attaching a folded sheet to the DPF that is tangent to repeating regions of the DPF, the DPF may be stiffened dramatically. Moreover, as illustrated in the figure, the attached corrugate has excellent tangency to the DPF for face to face bonding regions.

Figure 12A:
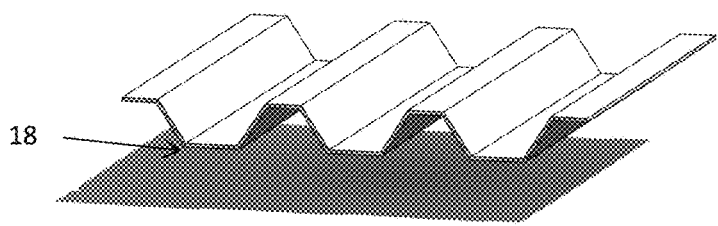
FIG. 12A shows a corrugate sheet that nests well in the DPF of FIG. 10.
Figure 12B:
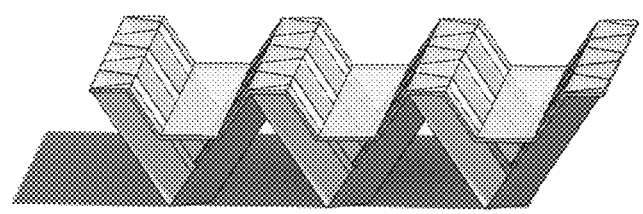
FIG. 12B shows the corrugate sheet of FIG. 12A laminated onto the DPF of FIG. 10.
Figure 16A:
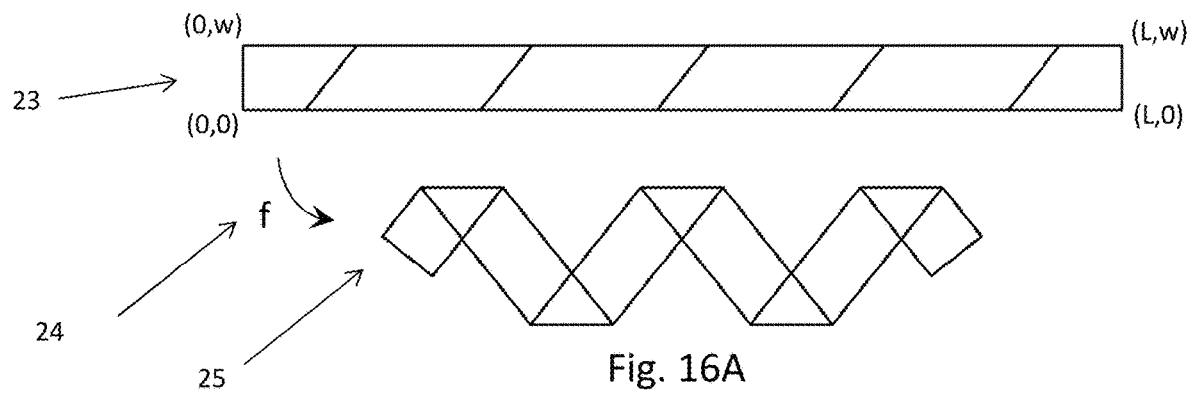
FIG. 16A is a column strip map similar to the triangle wave.
Figure 16B:
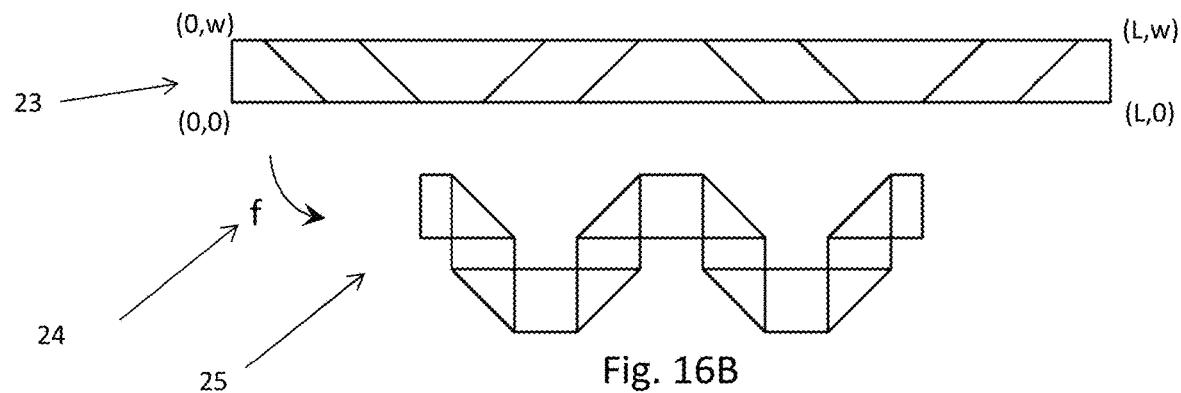
FIG. 16B is a column strip map similar to the square wave.
Figure 16C:
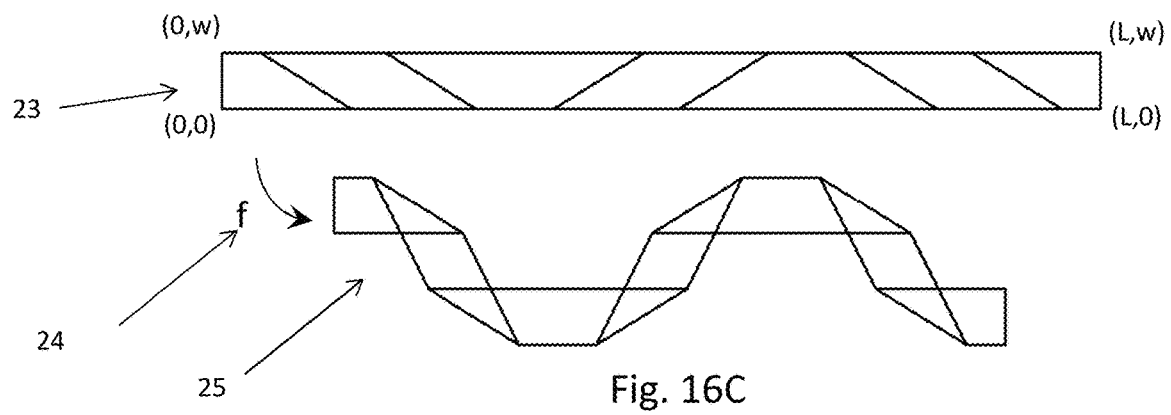
FIG. 16C is a column strip map similar to the hex wave.

To select which DPFs have good bonding regions with which corrugate profiles, the row and column data of the DPF and the corrugate profile should be designed in coordination. The strip map algorithm of U.S. Pat. No. 6,935,997 will be used in this next disclosure. FIGS. 10, 11, and 12 of U.S. Pat. No. 6,935,997 describe the strip map. A strip map is a function (24) from a thin rectangular strip (23) in the plane to a polygonal region (25) in the plane defined by projecting the folded and flattened strip to the plane. Three examples are shown here in FIG. 16A, FIG. 16B, and FIG. 16C. Suppose the width and length of the strip are w and L, respectively, and f:$[0, w] \times [0, L] \to R^2$ is the strip map, as shown in the figures. Choose RCS wave V for the row data to fit inside $R \times [0, w]$. Then the set product $V \times [0, L] \to R^3$ is a sheet with parallel folds. Defining $F:(x, y, z)=(x, f(x, y))$ and computing $F(V \times [0, L]) \subset R^3$ gives the folded DPF. This is explained in detail in U.S. Pat. No. 6,935,997, along with conversions to the other DPF algorithms. If the y-values of V include all of [0, w] then the projection of the DPF onto the YZ-plane will give the folded image of the strip map. In this case it is preferred to use a nesting corrugate profile that is tangent to the folded strip-map image (25). Moreover it is further preferred that the RCS has segments with constant y-value 0 or w. This will assure the DPF has rectangular regions tangent to the corrugate for face-to-face bonding.

Figure 17A:
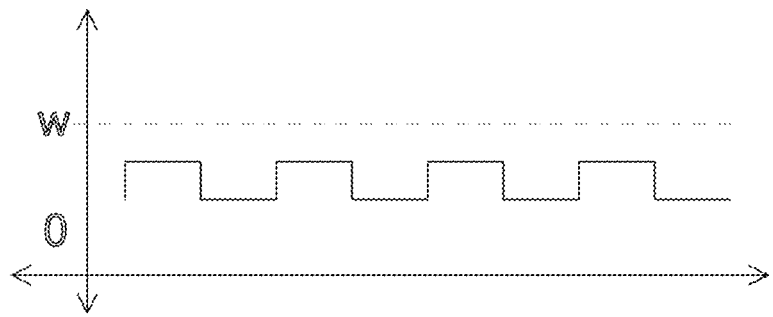
FIG. 17A shows a wave with amplitude insufficient to meet the boundaries of the strip map
Figure 17B:
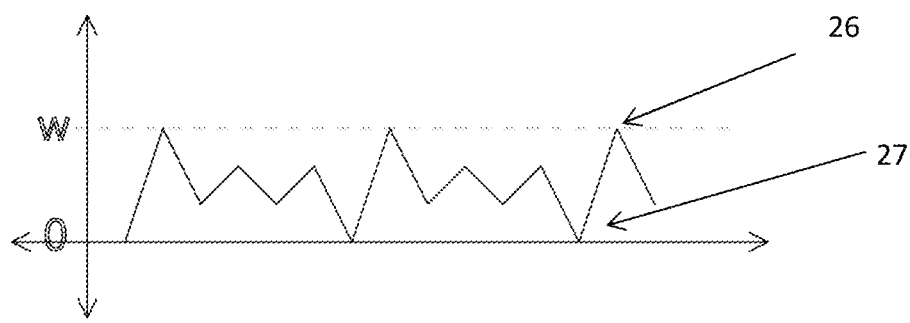
FIG. 17B shows a wave with amplitude sufficient to meet the boundaries of the strip map at discrete points
Figure 17C:
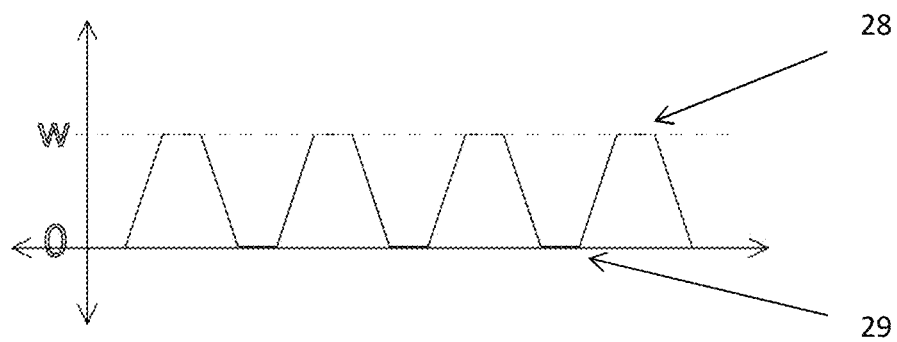
FIG. 17C shows a wave with amplitude meeting the boundaries of the strip map along segments for face-to-face bonding of tangent corrugates.
Figure 17D:
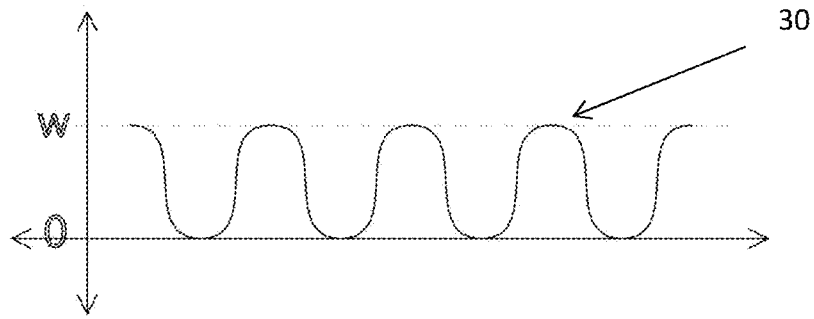
FIG. 17D shows a wave with amplitude smoothly tangent to boundaries of the strip map for curved regions tangent to the corrugates.

After choosing a strip map and corrugate profile tangent to the strip map, the RCS data should be chosen to have y-values spanning the full width of the strip. Consider FIG. 17A. Here, while located within the amplitude bounds of [0, w] as needed to define the strip map, the RCS wave does not meet the boundary of the strip. In this case the corrugate laminate would not contact the DPF except along RED edge chains. In FIG. 17B, the three maximal (26) and three minimal (27) points shown are in the boundary of the strip, and these would yield column fold edges on the DPF for bonding to the corrugate. In FIG. 17C, the maximal (28) and minimal (29) sections of the RCS are segments lying in the strip boundary. In this preferred embodiment, the DPF generated by the RCS and selected strip map will have rectangular face-to-face bonding areas between the corrugate and DPF corresponding to these segments. In FIG. 17D the RCS maximal (30) and minimal values are in the strip boundary, and bonding would occur along the fold arc of the surface.

Figure 13A:
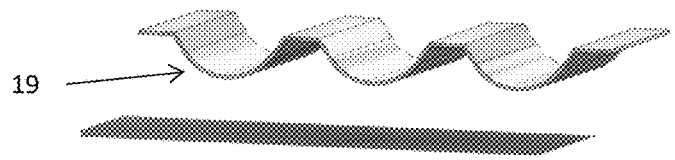
FIG. 13A shows a corrugate sheet that nests well in the DPF of FIG. 10.
Figure 13B:
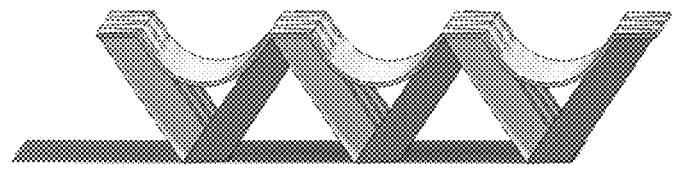
FIG. 13B shows the corrugate sheet of FIG. 13A laminated onto the DPF of FIG. 10.
Figure 14A:
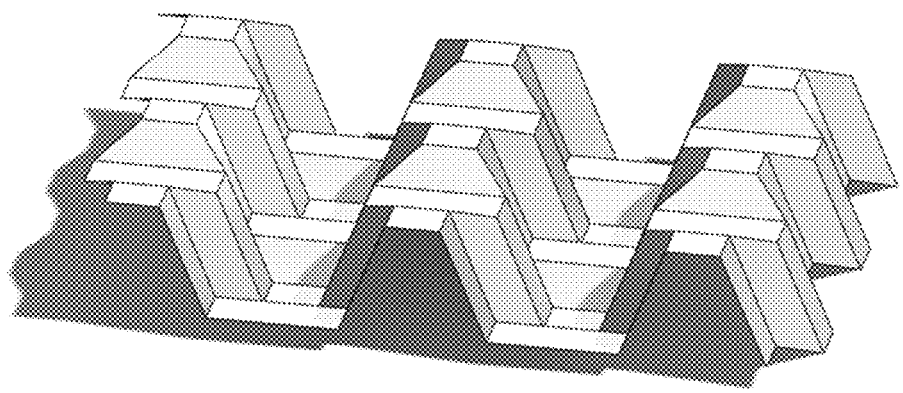
FIG. 14A is an enlarged image of FIG. 2C.
Figure 14B:
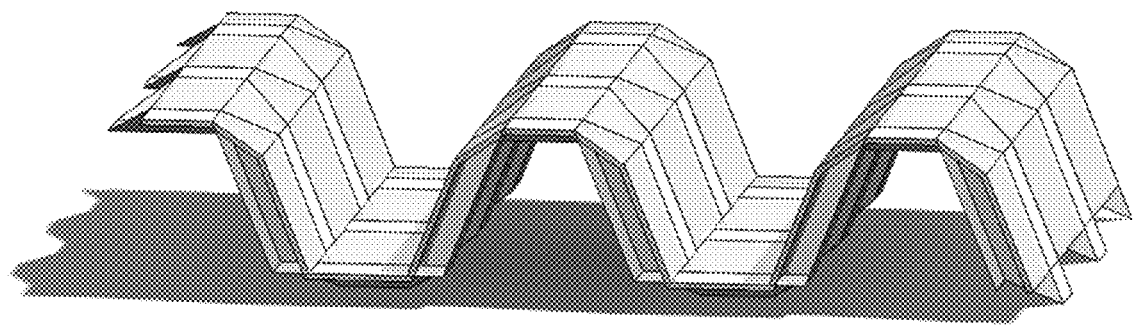
FIG. 14B shows a corrugate sheet laminated onto the DPF of FIG. 14A. It is tangent to the column strip map.
Figure 14C:
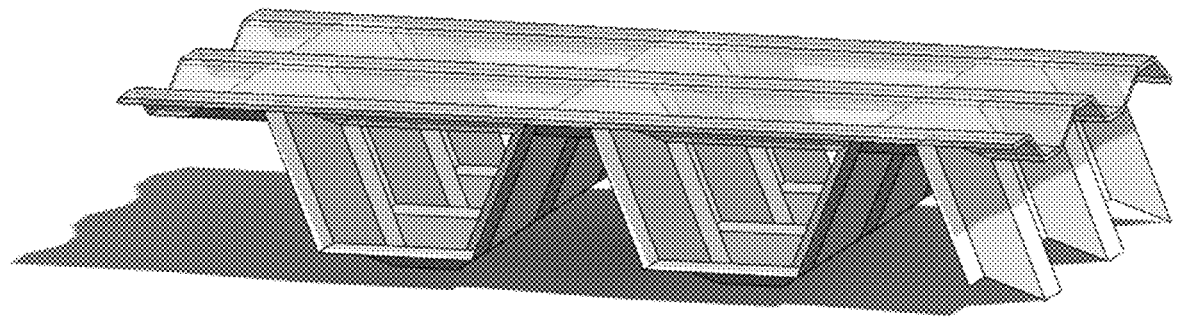
FIG. 14C shows a corrugate sheet laminated onto the DPF of FIG. 14A. It is tangent to RED row edge sequences.

The corrugate profile may be chosen to have various amounts of tangency to the folded strip map boundary. The structures shown in FIG. 11A, FIG. 12A, and FIG. 13A all have tangency to the same strip map used to generate the DPF. The structure of FIG. 11A is maximal in this regard, with a long triangle point (17) descending into the elbow of the strip map. The structure of FIG. 12A has cropped (18) the tip of the triangle point, making a shorter (and lighter) corrugate material that braces the DPF with an additional cross direction. The structure of FIG. 13A replaces the horizontal cross-brace (18) of the corrugate in FIG. 12A with an arc (19). This has certain advantages in manufacture and bonding of the corrugate to the DPF. In FIG. 14A the DPF was generated in the Two Cross-Section algorithm using two hex waves (12). The maximal profile tangent to the folded strip map was used to generate the corrugate shown in FIG. 14B. It is also possible to choose a corrugate tangent to the DPF in an orientation at 90 degrees to the example of FIG. 14B. FIG. 14C shows a corrugate designed to nest in the RED waves. In this embodiment the horizontal segments in both the RED and CCS waves (both hex waves) produce horizontal rectangular faces of the DPF that are tangent to the corrugate in FIG. 14C.

Figure 15A:
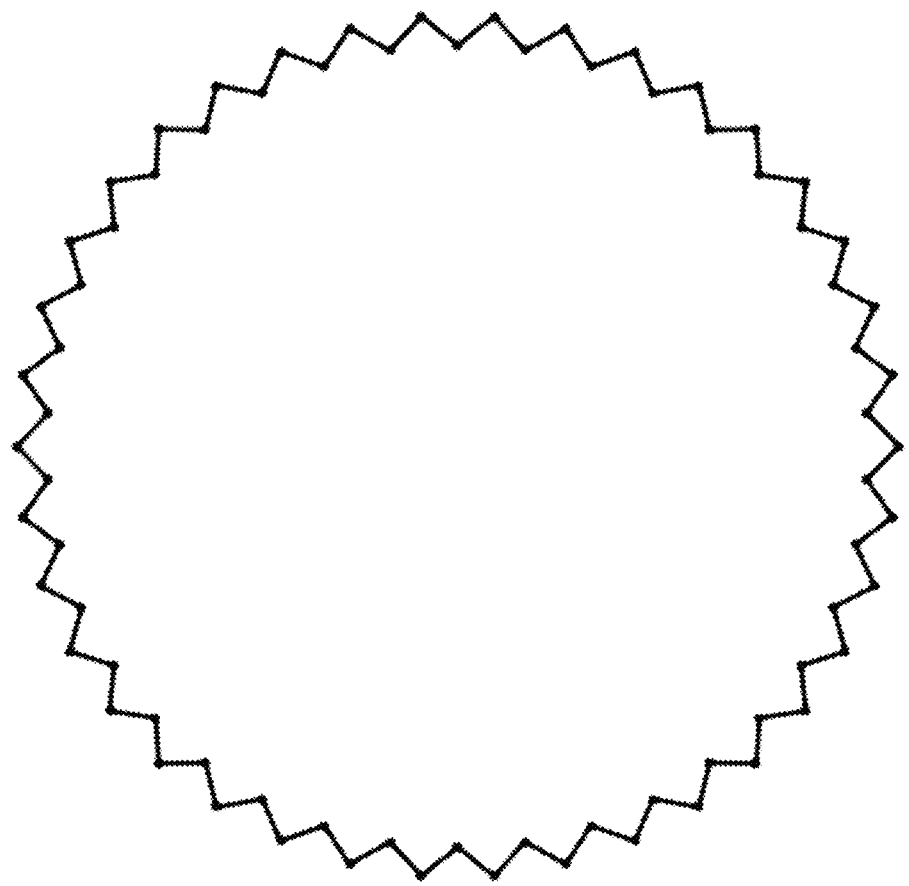
FIG. 15A is the star wave used for the CCS of FIG. 15C
Figure 15B:
FIG. 15B is the square wave used for the RED of FIG. 15C
Figure 15C:
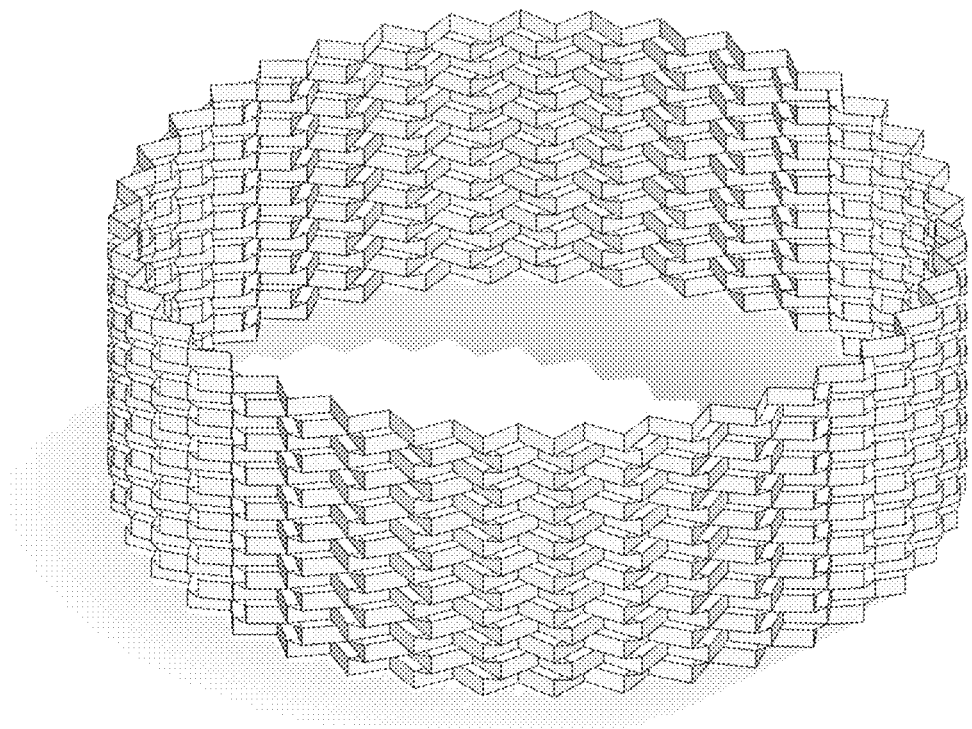
FIG. 15C is the DPF generated by the Wave Fold Method using the data from FIG. 15a and FIG. 15B

Structurally valuable geometries may be constructed by laminating multiple sheets to folded tessellations that are not readily made by other means. The lightweight rigid panels are believed to have robust strength and impact absorbing properties, making them valuable in many applications. In preferred embodiments these DPF multi-laminates may be used for vessels or shipping containers. The DPF in the form of a cylindrical drum shown in FIG. 15C is designed using a star wave (FIG. 15A) for the CCS and a square wave (FIG. 15B) for the RED. This produces a DPF with numerous tie areas for self-bonding. Tie areas are outlined in both U.S.

Figure 24:
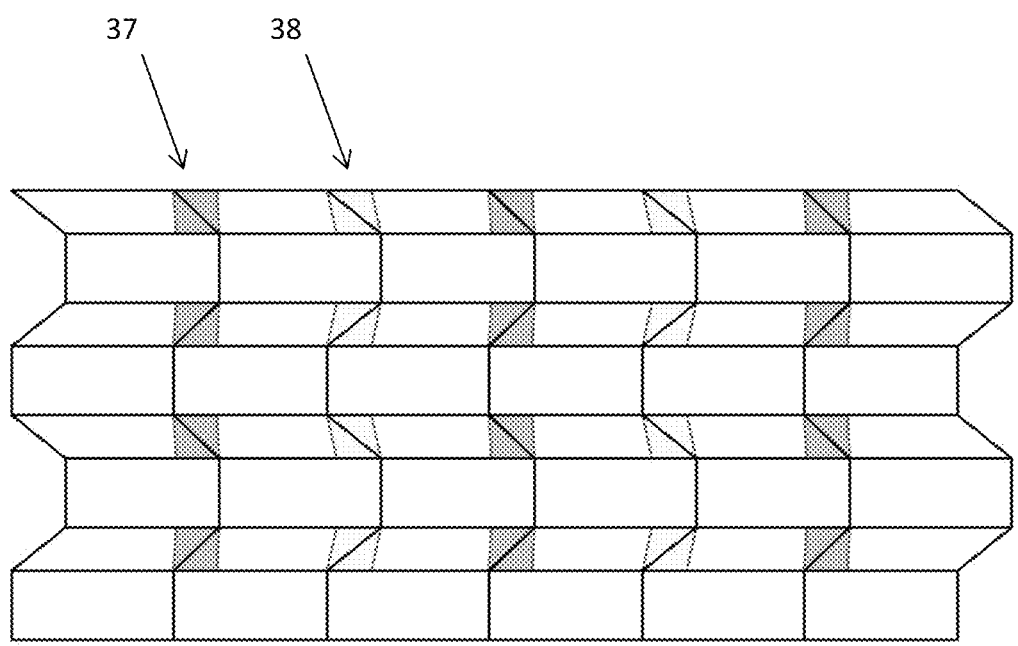
FIG. 24 is a portion of the folding tessellation for the DPF in FIG. 15C. The tie areas are shown in grey.

Pat. No. 6,935,997, and in U.S. Pat. No. 9,005,096. A section of the tessellation is shown in FIG. 24 with tie areas marked in grey. The black lines are for folding according to the convexity rule of U.S. Pat. No. 6,935,997. The triangular gray regions are shown in two shades (37, 38), one for applying glue on the top side of the sheet and the other for applying glue on the bottom side. These glue regions are tie areas, where the sheet will self-bond when fully folded. The resulting DPF is remarkably rigid. It will also accept tangent corrugate profile laminates as shown in the section view FIG. 15D with close up FIG. 15E. Additional cylindrical laminates may be bonded to the corrugates, as shown in the schematic FIG. 15F. To produce the desired bonding areas, the width of the strip map shown in the schematic should be spanned by the amplitude of the RCS square wave. The structure has many applications including from shipping drums to aircraft fuselages.

Figure 19A:
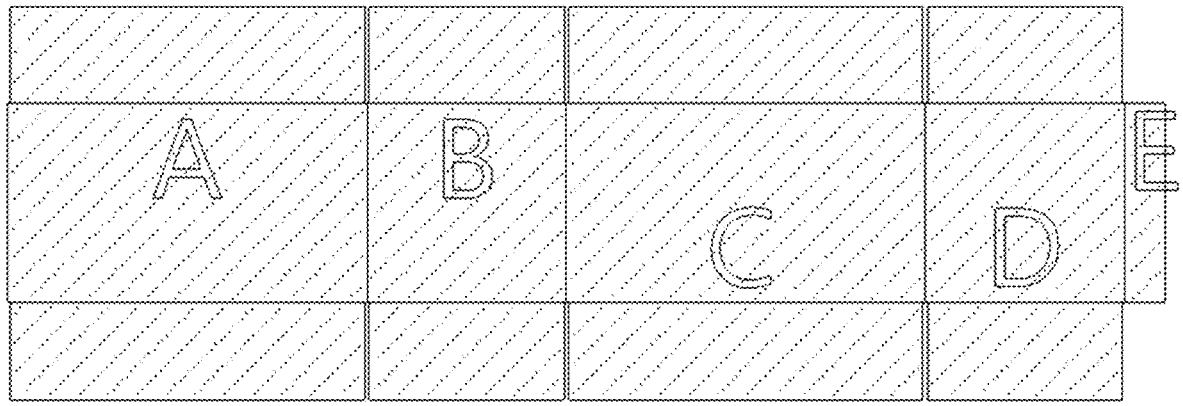
FIG. 19A shows the a box cut-out pattern.
Figure 19B:
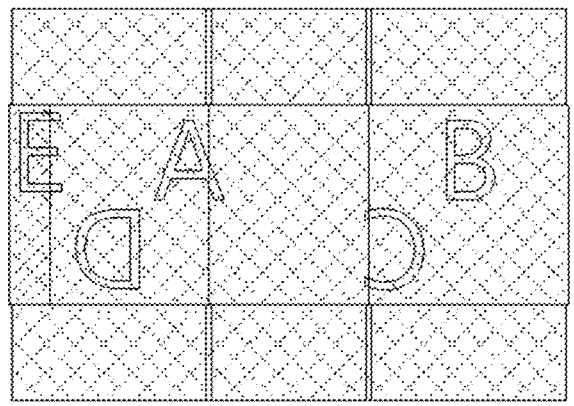
FIG. 19B shows the box cut-out pattern of FIG. 19A partially assembled into a flattened rectangular tube.

In some applications the multi-laminate DPF panels may be fabricated and then cut or scored to assemble into objects. FIG. 19A shows a box panel pattern. The four sides of the box may be first joined to form a rectangular tube, and then the flaps for the base and top folded over. In FIG. 19B the image shows a preferred embodiment, where the panels C, D, and E are folded around and under with overlapping tab E, and then folded again to join A and make the rectangular tube. This partially assembled box lies flat as a rectangular tube and ships and stacks in this low volume pre-assembled form.

Figure 20:
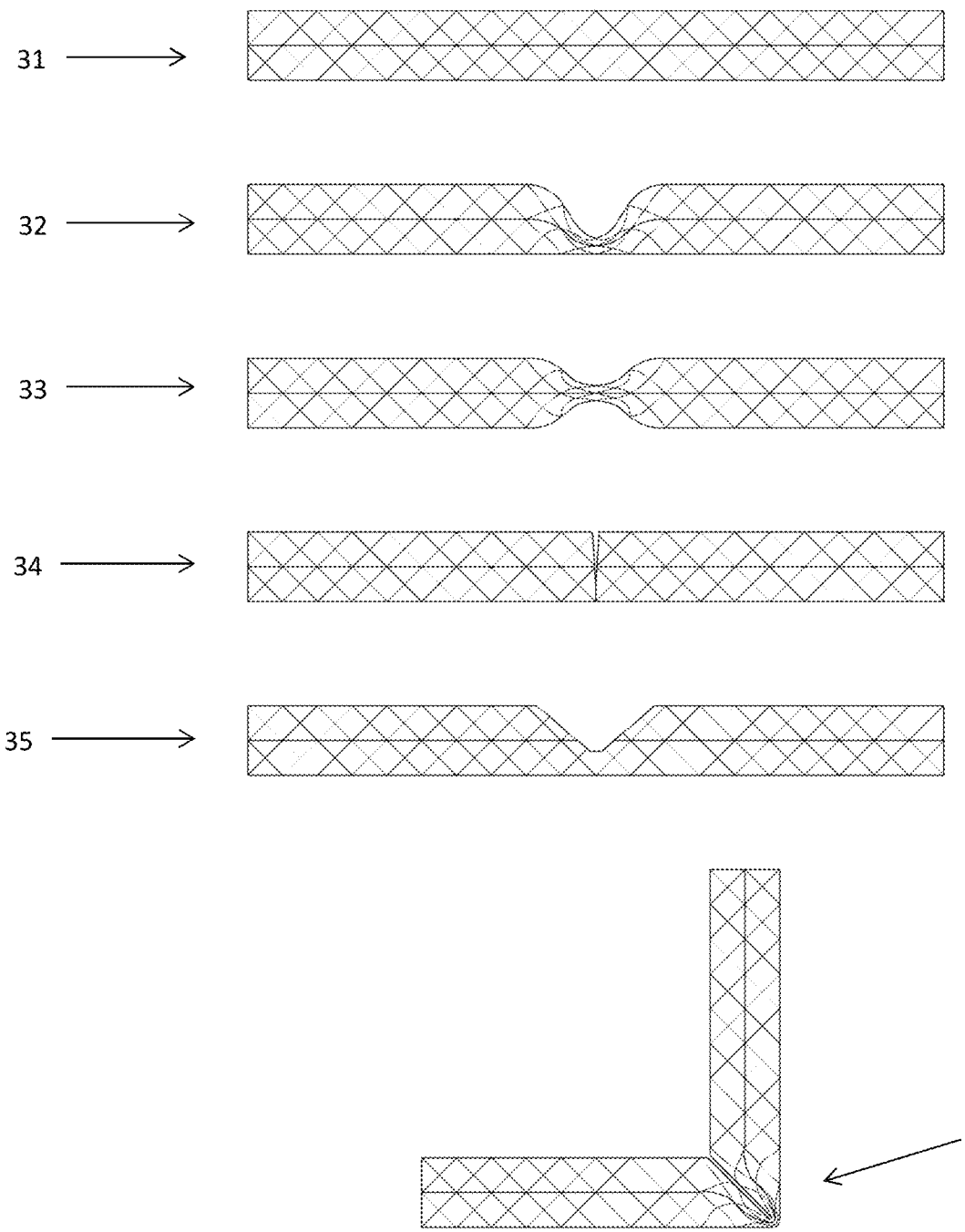
FIG. 20 is a schematic showing methods for embedding crease lines in a multi-laminate panel to initiate folding along the embedded lines.

The cut pattern for the box may include various types of embedded crease lines to promote folding at the desired fold crease locations. FIG. 20 shows several alternatives, including crushing the core material from one (32) or both (33) sides, slitting (34) the material part way through, and routing out a fold crease channel (35). For the multi-laminate DPFs their thickness and stiffness can make it difficult to fold into other objects and it is recommended that some form of embedded crease line is pre-marked along the fold crease locations to assure the assembly of the multiple flat panels into the objects. The drawing (36) represents the one-sided crushed pattern (32) after folding. Other methods of embedding crease lines to promote the fold creases are available. For heavy materials it is also possible to use joinery, fillets, and corner moldings.

Figure 15D:
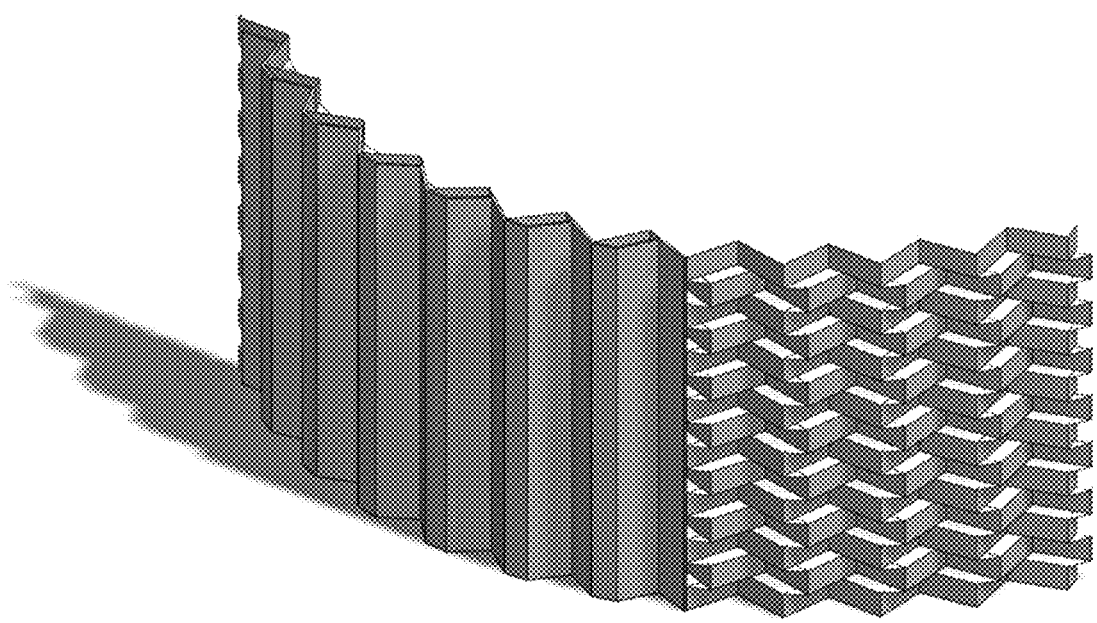
FIG. 15D is a section of FIG. 15C with laminated corrugate facing.
Figure 15E:
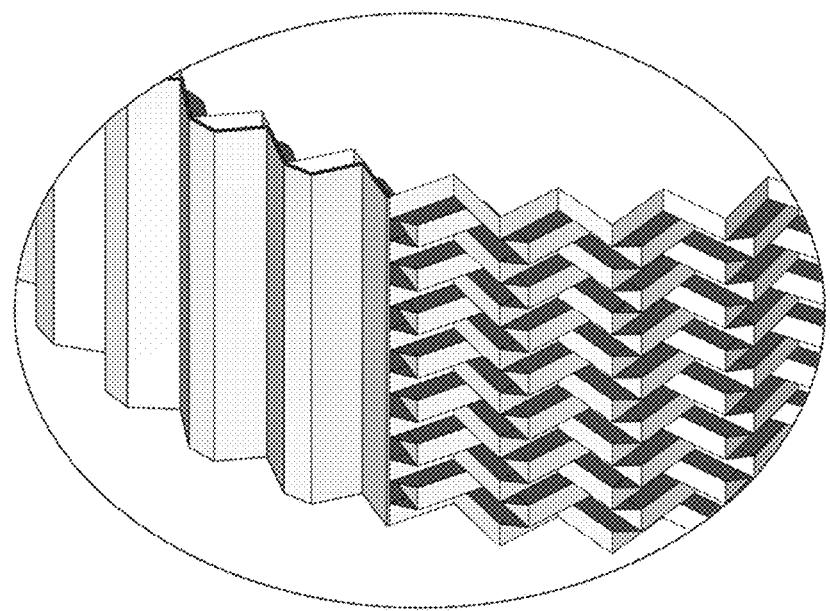
FIG. 15E is an enlarged close-up of FIG. 15D
Figure 15F:
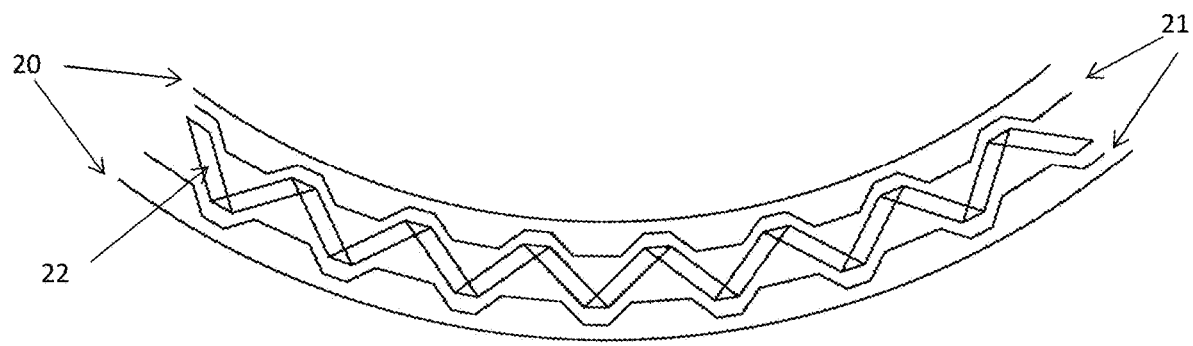
FIG. 15F is the schematic of a five sheet laminate extending the construction of 15D with two laminate corrugates and two outer laminate cylindrical face sheets.

Depending on the application, the DPF laminate may have 2, 3, 4, 5, 6, 7, or more layers which include various sequences of DPFs, flat sheets, and corrugates of various profiles. FIG. 3B, FIG. 6A, FIG. 6B, and FIG. 8 show three DPFs that when laminated as in FIG. 7B form a material made from three DPFs. Similar laminates can be made in any number of DPFs. FIG. 9 has one DPF and two flat sheets, FIG. 11B, FIG. 12B, FIG. 13B, FIG. 14B, and FIG. 14C show one DPF with one upper face corrugate in the image, where the corrugate may be also attached to the lower face. In preferred embodiments both sides would also have a flat sheet laminated to the outside of the corrugates, producing a composite with one DPF, two corrugates and two flat sheets. FIG. 15D shows a section of a DPF and corrugate, where it is indicated in FIG. 5F that this extends to a system with one DPF, two corrugates, and two cylindrical smooth surfaces.

Figure 18A:
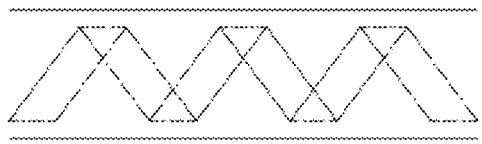
FIG. 18A shows a schematic representing a DPF by its strip map and two flat face sheets for a three layer laminate.
Figure 18B:
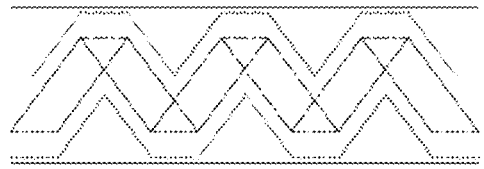
FIG. 18B shows a schematic of a DPF strip map, two corrugate laminates, and two flat face sheets for a five layer laminate.
Figure 18C:
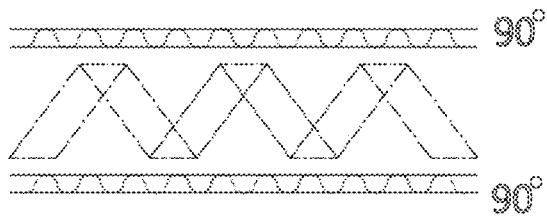
FIG. 18C shows a schematic of a DPF strip map, two corrugate laminates, and four flat sheets for a seven layer laminate.
Figure 18D:
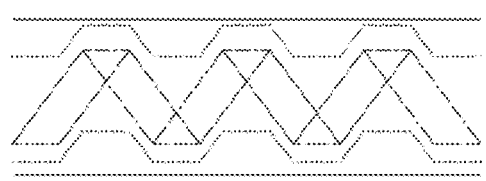
FIG. 18D shows a schematic of a DPF strip map, two corrugate laminates, and two flat sheets for a five layer laminate.
Figure 18E:
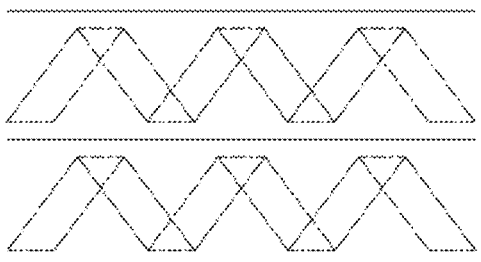
FIG. 18E shows a schematic of a two DPF strip maps, and three flat sheets for a five layer laminate.
Figure 18F:
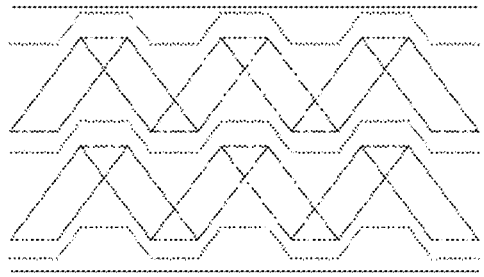
FIG. 18F shows a schematic of a two DPF strip maps, and three corrugate sheets, and two flat sheets for a seven layer laminate.
Figure 21:
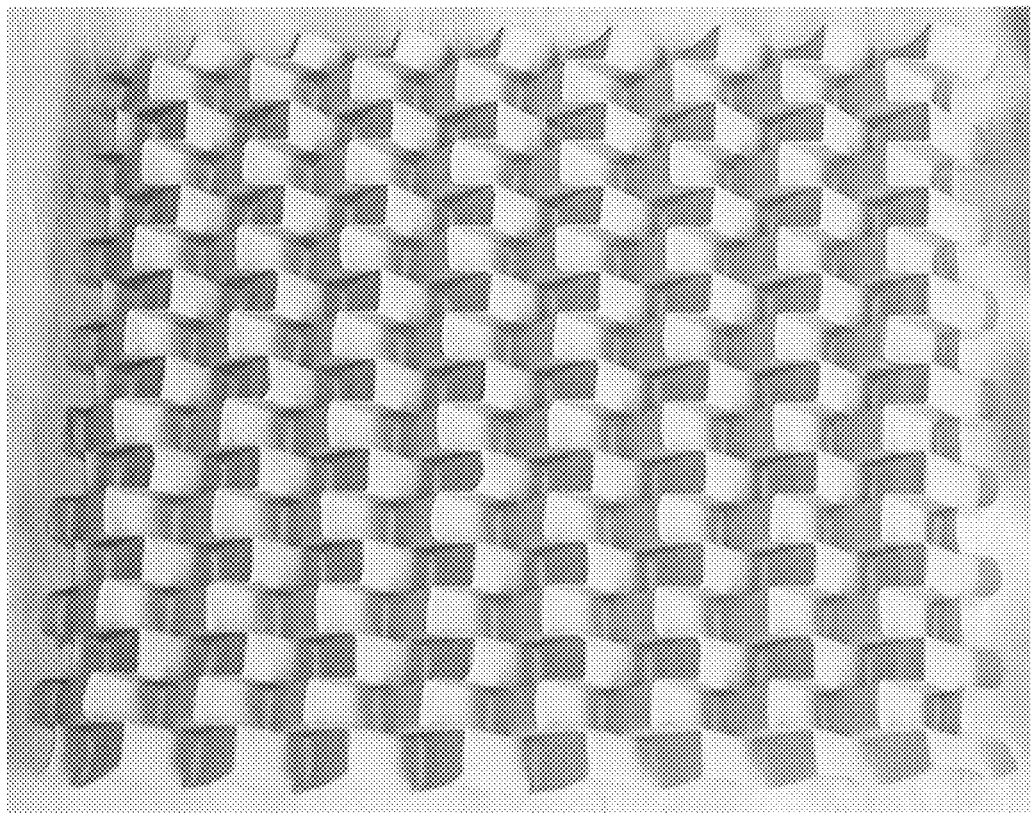
FIG. 21 is a core material folded from Kraft paper and self-glued at its tie areas.
Figure 22:
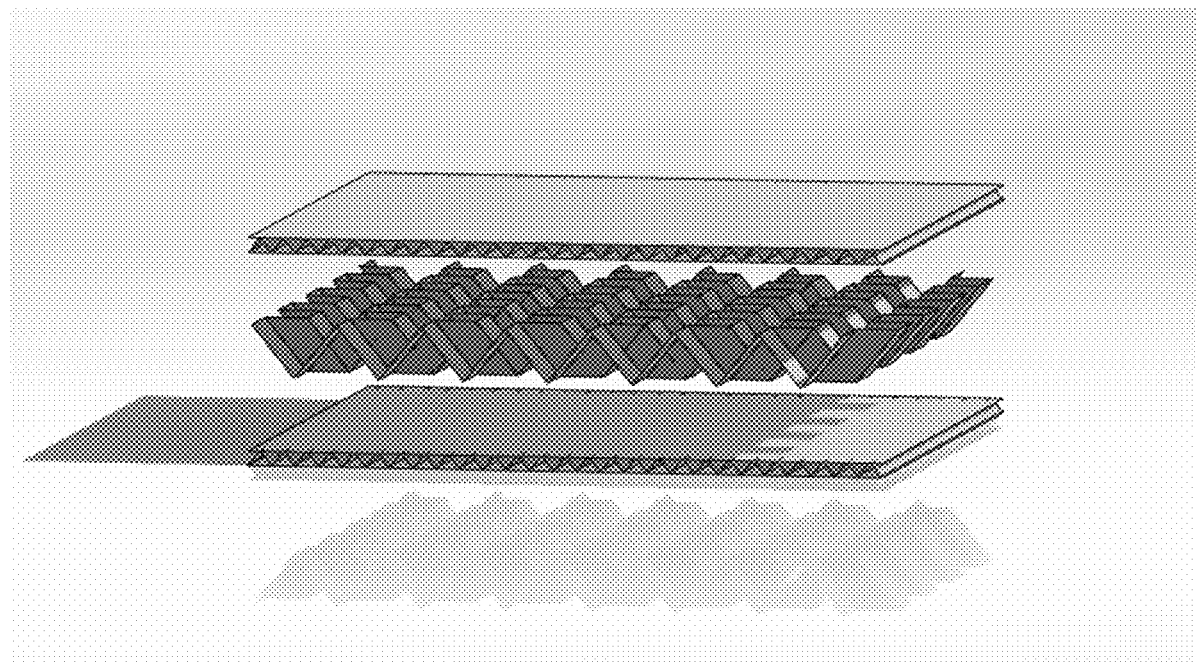
FIG. 22 is a seven layer multi-laminate with schematic of FIG. 18C and DPF from FIG. 21
Figure 23:
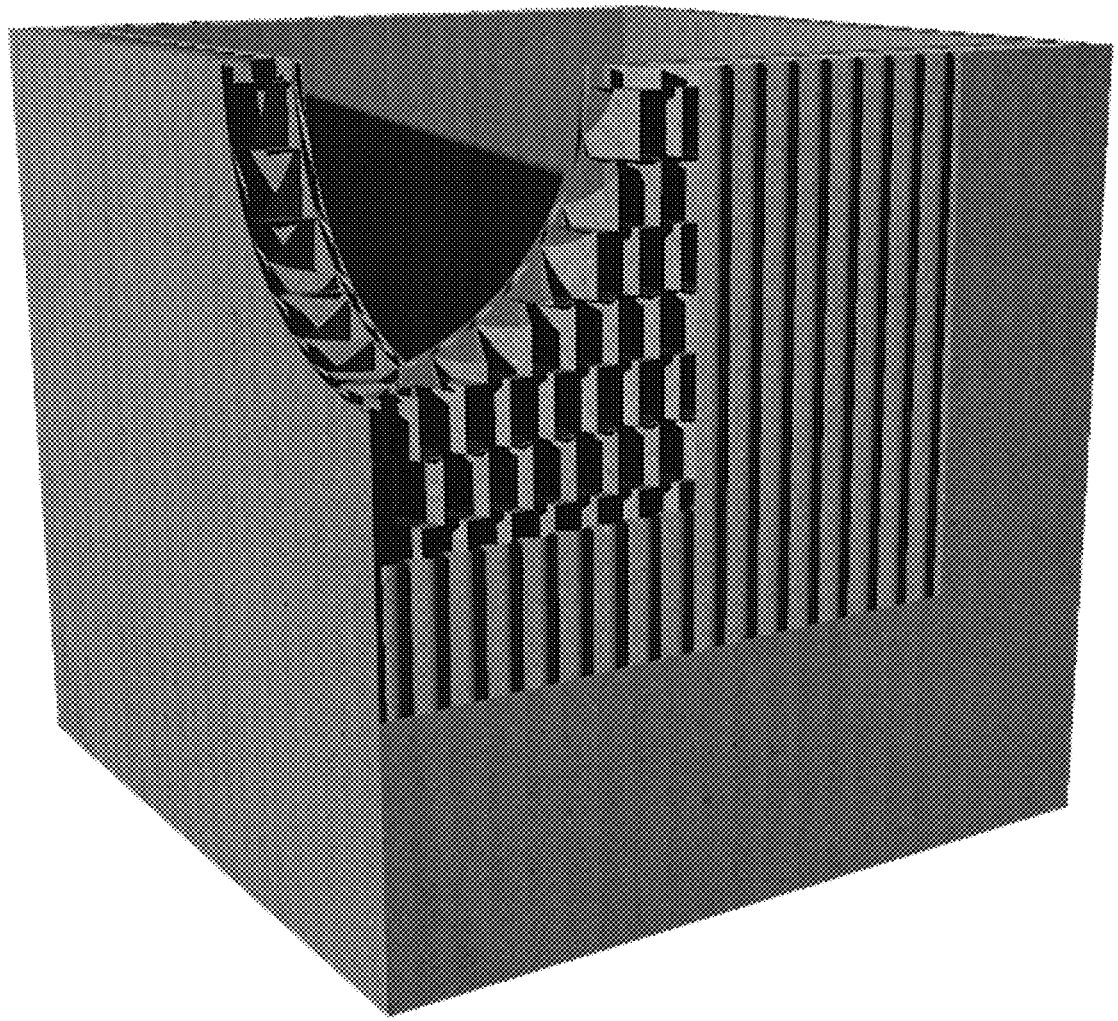
FIG. 23 is a shipping box constructed from laminate panels fabricated as in FIG. 22

A seven layer system is shown in FIG. 22. The DPF is generated by a triangle wave (10) CCS and square wave (11) RED. Pre-laminated faced corrugate sheets are then attached to each side. The sheets each have three layers, namely, a sine wave type (13) corrugate with two flat face sheets. The middle layer DPF is shown in FIG. 21. The DPF in the photograph is a Kraft paper DPF folded and glued along the tie areas in this geometry. The seven layer construction of FIG. 22 is also shown in a cutaway view of a heavy duty shipping container in FIG. 23. The pre-laminated faced corrugate panels may be laminated to the DPF in either 90 degree orientation. Laminate systems are shown in FIG. 18A, FIG. 18B, FIG. 18C, FIG. 18D, FIG. 18E, and FIG. 18F. In these figures the dotted lines represent corrugate profiles, the solid lines represent flat sheets, and the dot-dashed lines represent the strip map. It is preferred that the RCS used would span the width of the strip map, preferably with segments in the strip-map boundary. This provides bonding regions. FIG. 18A is illustrated in FIG. 9 where two flat laminates bond to a DPF. FIG. 18B is similar to the five layer cylindrical lamination system shown in FIG. 15F. The seven layer system of FIG. 18C appears in FIG. 22 and FIG. 23. Note in the schematic the 90 degree marking indicates that the corrugate orientation may be turned 90 degrees (so that the cross section profile would not be viewed in the image), enabling the stiffness of the corrugate to bridge from RED to RED edge sequence and combine to give improved truss geometry mechanics. FIG. 18D and FIG. 18B are similar. The corrugate profile in FIG. 18B has longer tangency segments to the folded strip map boundary, while in FIG. 18D less material is needed to produce the laminate structure. FIG. 18E shows a two DPFs in a laminate with three flat sheets. FIG. 18F shows two DPFs joined by a corrugate. In all it has two DPFs, three corrugates, and two flat sheets.

Boxes and other containers are used to ship materials, and provide the contents with protection from environmental factors. It is desirable that the walls of the container:
1) Have stiffness to prevent the container from crushing under load and damage the contents
2) Be light weight to reduce manufacturing and shipping costs
3) Be inexpensive to manufacture
4) Have impact-absorbing construction to minimize the shock that is transferred to the contents as a result of dropping or bumping The state of the art includes many laminate box and container constructions, including one- and multi-layered corrugate cardboard, and honeycomb panels. The present inventive concepts encompass a multi-laminate construction with one or more layers using a folding tessellation pattern. These structures are believed to outperform honeycomb structures in many of the capacities (1-4) listed above. In particular honeycomb structures are expensive to manufacture and have problems in that they readily transfer shock in some directions, while collapsing from shock in other directions. By comparison, it is believed that the folded-core structures disclosed herein absorb shock more evenly in all directions, and have lower peaks in the energy transfer time-line during impact.

When constructing boxes, several laminate panel designs using folding tessellations may be preferred. For example, FIG. 9 shows an exemplary laminate panel design. The upper face has been peeled away to show the core material. Here the folded tessellation core is designed using a triangle wave (10) for both the RED and CCS. Other choices, including using waves similar to the hex wave (12), the square wave (11), and a sine or similar wave (13) for the RED can be used in the alternative. The resulting folded tessellation may be sandwiched between two flat faces as shown in FIG. 9 with the chevron tessellation.

The laminate panels may be formed in full sheets with the described three layer design. These sheets may then be cut into box folding patterns with crimping on the lines of the box edges to induce the folding of the box sides. In many cases it may be desirable to have at least one face of the panel constructed from material that is thicker than the stock used to fold the core. It may also be desirable to use a stiffer material on the face. This may assist in providing smooth appearance and puncture resistance to the box face. In many cases it may be desirable to construct the laminate panel with more than three layers, where at least one of them is a folded tessellation pattern. For example a five layer laminate may be constructed in sequence: (i) flat sheet, (ii) folded tessellation, (iii) flat sheet, (iv) folded tessellation, (v) flat sheet as in FIG. 18E. It may be desirable that (i) is of thicker stock than (ii) or (iv). It may be desirable that (ii) is oriented at 90 degrees to (iv), or that (ii) and (iv) are different patterns. For example, to yield a smoother face at (i) that is more puncture resistant, (ii) may be finer than (iv). Other laminate sequences are also preferred. For example, two three-layer laminates similar to FIG. 9 may be laminated together to produce a six layer laminate. Another preferred embodiment has the laminate sequence: (i) flat sheet, (ii) folded tessellation, (iii) flat sheet, (iv) folded tessellation, (v) flat sheet, (vi) folded tessellation, (vii) flat sheet. For this sequence it may be preferred that (iv) is a larger scale pattern than (ii) and (iv). Also, layers may be at 90 degrees turned to each other. In some cases, it may be preferred that more than seven layers are used, to absorb more impact energy, particularly in applications involving high levels of shock.

The multiwall boxes may be constructed by gluing multiple layers together to yield a panel which is then die cut and crimped along the box fold lines. An example is shown in FIG. 19A. Alternatively, some of the layers may be inserted into the box after it is folded to add the additional protection. For example, it may be preferred that two boxes are folded separately and nested together, or that panels are inserted on the bottom of the box for impact protection.

The inventive concepts include design of cylindrical containers as well. Shipping tubes and drums are often single walled vessels with much thicker stock material than their counterparts in flat sided containers. The advantages of using a multi-laminate design with structural core material do not apply easily using honeycomb cores, as these do not fit well on a cylinder. While corrugate cores will fit a cylinder, they lack the performance needed. The folded tessellation core can be designed to fit on any size cylinder. The star wave (15A) can be selected to have chosen inner and outer radius. By using this as the CCS data, and a choice of wave types (including 10, 11, 12, and 13) for the RED data, a cylindrical core material can be designed. Laminating a face sheet to this core will yield a nearly cylindrical multi-laminate structure using this technology. The thickness and multi-laminate sequencing options discussed above apply here as well.

In another possible embodiment, folding tessellations may be used as a structural core material in a laminate container construction using additional energy absorbing materials between the container walls and the contents. This may include loose fill, such as Styrofoam peanuts, shredded paper, or air pillows. Padding blankets such as perforated paper, folded tessellations, bubble wrap, tissue paper, and other products can also be used. Together the energy absorbing properties of the folded tessellation in the container wall with the energy absorbing properties of fill material provide improved protection. Additionally the integrity and stiffness of the high performance wall, it is believed, will reduce crushing of the packaging and the fill material also reduces shifting of contents during shipment. In one embodiment, the inner face of the container is designed with exposed DPF. This grips the loose fill and prevents shifting during shipment.

Boxes and containers with this enhanced protection are suited for many forms of automated shipping and delivery. The robust construction protects the contents and enables automated delivery systems. Automated chutes and picking and placing mechanisms often bump the contents, and the use of folded tessellations, it is believed, can mitigate the damage.

In one possible embodiment, a container may be delivered to its destination by an unmanned aerial vehicle (UAV). The UAV preferably is guided by a GPS system and has sensors and software determining a safe drop-off location for the package. This should include recognizing flat drop off sites, an unobstructed path to the drop off location, and the safe distance of all people, animals, and objects. In a preferred embodiment the UAV may descend to a height above the reach of people and animals, but not higher than 25 feet. In a preferred embodiment the UAV may descend to a height above the reach of people and animals, but not higher than 15 feet. In these ranges the parcel will not be severely affected by dropping to the ground, particularly with tethering or decelerating mechanisms, and the blades of the UAV will be above the height were they could cause injury to people, animals or things below. It is preferred that the container employ a multi-laminate design to add strength and impact absorption while reducing weight. In another possible embodiment, at least one of the laminates is a folding tessellation.

Generally, the multi-laminate construction with nested DPS, corrugates, flat sheets, and tailored nesting geometries gives robust materials valuable anywhere strength, light weight, energy absorption, and cost effectiveness are needed. Other applications include crash protection panels in automobiles, acoustic structural panels, construction materials, and more.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A laminate panel comprising at least a first and a second layer of sheet material, wherein:
   the first layer has fold lines that form a first tessellation pattern on the first layer;
   the first tessellation pattern defines polygons;
   each side of the polygons is an edge having endpoints that are vertices,
   at least some of the vertices are each coincident with at least four of the edges, and with at least four of the polygons that are not adjacent to a perimeter of the sheet;
   the first layer has two bounding tangentially conforming surfaces that are planar, cylindrical or curved surfaces;
   the second layer has fold lines that form a second pattern in the second layer;
   the second layer nests into the first layer so that portions of the second layer lie between the two bounding tangentially conforming surfaces;
   the second layer is bonded to the first layer at a plurality of rectangular bonding regions on the first and second layers;

the bonding regions on the first layer are located between the two bounding tangentially conforming surfaces; and the second pattern is different than the first tessellation pattern.

2. The laminate panel of claim 1, wherein:
the first and second layers nest within each other;
the first and second layers each has a mating side; and
the mating side of the first layer is bonded to mating side of the second layer.

3. The laminate panel of claim 2, wherein the first sheet has a folding tessellation geometry including at least one triangle wave.

4. The laminate panel of claim 3, where the folding tessellation geometry is generated by the Two Cross-Section Algorithm with a triangle wave for CCS data.

5. The laminate panel of claim 1, further comprising a third layer of sheet material, wherein:
the third layer nests into the first layer so that portions of the third layer lie between the two bounding tangentially conforming surfaces; and
the third layer is bonded to the first layer at a plurality of face-to-face rectangular bonding regions lying between the two bounding tangentially conforming surfaces.

6. The laminate panel of claim 5, the first layer has a stiffness that is less than a stiffness of at least one of the other layers of the laminate panel.

7. The laminate panel of claim 6, further comprising a fourth layer of sheet material, wherein the fourth sheet is substantially planer, cylindrical, or singly curved.

8. The laminate panel of claim 1, wherein the first layer has internal contact sites for self-to-self bonding.

9. The laminate panel of claim 1, wherein the first tessellation pattern is generated by the Two Cross-Section Algorithm with either the RCS or CCS data a hex-wave.

10. The laminate panel of claim 1, wherein the second pattern is different than the first tessellation pattern independent of scaling.

11. The laminate panel of claim 1, wherein the first tessellation pattern is generated by the Two Cross-Section Method with the triangle wave or star wave for CCS; and the second pattern is a corrugate profile surface.

12. The laminate panel of claim 11, wherein the corrugate profile surface is configured to brace the first layer in a row direction of the first layer.

13. The laminate panel of claim 1, wherein the second pattern is a corrugate profile surface with profile cross-section comprising a plurality of arcs.

14. The laminate panel of claim 1, wherein the second pattern is a corrugate profile surface with profile cross-section substantially a hex wave.

15. The laminate panel of claim 1, wherein: the first tessellation pattern is based on a Two Cross-Section algorithm using two hex waves; and the second pattern is based on a maximal profile tangent to a folded strip map.

16. The laminate panel of claim 15, wherein the second pattern is configured to nest within RED waves of the first tessellation pattern.

17. The laminate panel of claim 16, wherein the second pattern comprises a plurality of horizontal rectangular faces based on RED and CCS waves.

18. The laminate panel of claim 1, wherein the first tessellation pattern is based on The Two Cross-Section Method using a triangle wave or star wave for RCS and a square-wave for CCS; the first tessellation has quadrilaterals with triangular sub-regions that meet in the folded state to form tie areas; and adhesive is applied to the tie areas.

19. The laminate panel of claim 18, wherein the second pattern is based on a maximal profile tangent to a folded strip map.

20. A shipping container comprising a laminate panel, the laminate panel comprising at least a first, a second, a third, a fourth, and a fifth sheet of material, wherein:
the first sheet has fold lines formed therein;
the fold lines form a first tessellation having a first folded pattern generated by the two cross-section algorithm, with a triangle wave for CCS data;
a plurality of vertices of the tessellation are each coincident with four polygons of the tessellation, each of the four polygons being non-adjacent to a perimeter of the sheet;
the second sheet is a plane unfolded sheet or a folded corrugation;
the third sheet is a plane unfolded sheet or a folded corrugation;
the second and third sheets are bonded to the first sheet;
the fourth sheet is bonded to the second sheet;
the fifth sheet is bonded to the third sheet;
at least one of third and fourth sheets is a folded corrugation having a second folded pattern different than the first folded pattern; and
the first sheet has a stiffness less than a stiffness of at least one of the other sheets of the shipping container.

21. The shipping container of claim 20, wherein the first folded pattern is generated by the Two Cross-Section Algorithm with a triangle-wave for the CCS data and a triangle-wave for the RCS data.

22. The shipping container of claim 20, wherein the first folded pattern is generated by the Two Cross-Section Algorithm with a triangle-wave for the CCS data and a sine-wave or hex-wave for the RCS data.

23. A laminate panel comprising at least a first and a second layer of sheet material, wherein:
the first layer has fold lines that form a first tessellation pattern on the first layer;
the first tessellation pattern defines polygons;
each side of the polygons is an edge having endpoints that are vertices;
at least some of the vertices are each coincident with at least four of the edges, and with at least four of the polygons that are not adjacent to a perimeter of the sheet;
the first layer is generated by the Wave-Fold Method with an RED wave and an CCS wave;
the second layer is substantially similar to the first layer; and
the first and second layers are nested and bonded on their mating sides.

24. The laminate panel of claim 23, wherein the RED is a wave comprising a plurality of arcs; and the CCS is the triangle wave.

25. The laminate panel of claim 23, wherein the amplitude of the RED wave is greater than the length of the period of the CCS wave.

26. The laminate panel of claim 23, wherein the successive ridges formed by RED waves nest substantially and eliminate the line of sight along the valley formed by the RED wave between the two ridges.

* * * * *